US010217060B2

(12) United States Patent
Yousefi'zadeh et al.

(10) Patent No.: US 10,217,060 B2
(45) Date of Patent: Feb. 26, 2019

(54) CAPACITY AUGMENTATION OF 3G CELLULAR NETWORKS: A DEEP LEARNING APPROACH

(71) Applicant: The Regents of the University of California, Oakland, CA (US)

(72) Inventors: Homayoun Yousefi'zadeh, Irvine, CA (US); Amr Albanna, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/488,330

(22) Filed: Apr. 14, 2017

(65) Prior Publication Data
US 2017/0359754 A1     Dec. 14, 2017

Related U.S. Application Data

(60) Provisional application No. 62/348,098, filed on Jun. 9, 2016.

(51) Int. Cl.
*G06N 99/00*     (2010.01)
*H04W 24/02*    (2009.01)
(Continued)

(52) U.S. Cl.
CPC .......... *G06N 99/005* (2013.01); *H04W 24/02* (2013.01); *H04W 24/08* (2013.01); *H04W 24/10* (2013.01)

(58) Field of Classification Search
None
See application file for complete search history.

(56) References Cited

U.S. PATENT DOCUMENTS 6,141,565 A * 10/2000 Feuerstein ............ H04W 16/06
                                                         455/422.1
6,490,452 B1    12/2002 Boscovic et al.
(Continued)

OTHER PUBLICATIONS

U. Turke and M. Koonert, "Advanced site configuration techniques for automatic umts radio network design," in Vehicular Technology Conference, 200. VTC 2005—Spring. 2005 IEEE 61st, vol. 3, May 2005, pp. 1960-1964 vol. 3.
(Continued)

*Primary Examiner* — Brian S Roberts
(74) *Attorney, Agent, or Firm* — Nguyen & Tarbet Patent Law Firm

(57) ABSTRACT

Optimal enhancement of 3G cellular network capacity utilizes two components of learning and optimization. First, a pair of learning approaches are used to model cellular network capacity measured in terms of total number of users carried and predict breakpoints of cellular towers as a function of network traffic loading. Then, an optimization problem is formulated to maximize network capacity subject to constraints of user quality and predicted breakpoints. Among a number of alternatives, a variant of simulated annealing referred to as Block Coordinated Descent Simulated Annealing (BCDSA) is presented to solve the problem. Performance measurements show that BCDSA algorithm offers dramatically improved algorithmic success rate and the best characteristics in utility, runtime, and confidence range measures compared to other solution alternatives. Accordingly, integrated iterative method, program, and system are described aiming at maximizing the capacity of 3G cellular networks by redistributing traffic from congested cellular towers to non-congested cellular towers.

57 Claims, 11 Drawing Sheets

An exemplary flowchart of the present invention.

(51) Int. Cl.
H04W 24/08 (2009.01)
H04W 24/10 (2009.01)

(56) References Cited

U.S. PATENT DOCUMENTS

| | | | |
|---|---|---|---|
| 7,197,311 B2 | 3/2007 | Matusz | |
| 7,272,400 B1* | 9/2007 | Othmer | H04L 12/1886 370/338 |
| 8,085,709 B2 | 12/2011 | Franceschini et al. | |
| 8,259,659 B2 | 9/2012 | Luft et al. | |
| 8,301,156 B2* | 10/2012 | del Rio-Romero | H04W 28/08 370/235 |
| 8,488,507 B2 | 7/2013 | Luft et al. | |
| 8,755,405 B2 | 6/2014 | Kovvali et al. | |
| 8,989,050 B2 | 3/2015 | Cavalcante et al. | |
| 9,001,682 B2 | 4/2015 | Kovvali et al. | |
| 2004/0029592 A1* | 2/2004 | Shyy | H04L 45/02 455/453 |
| 2004/0180659 A1* | 9/2004 | Pedraza | H04W 36/20 455/436 |
| 2006/0142021 A1* | 6/2006 | Mueckenheim | H04W 36/22 455/453 |
| 2009/0280853 A1 | 11/2009 | Brisebois et al. | |
| 2010/0144363 A1 | 6/2010 | De Rosa et al. | |
| 2012/0202504 A1 | 8/2012 | Wegmann et al. | |
| 2013/0324076 A1 | 12/2013 | Harrang | |
| 2014/0057627 A1 | 2/2014 | Hejazi et al. | |
| 2014/0148175 A1* | 5/2014 | Luo | H04W 28/08 455/445 |
| 2014/0204794 A1 | 7/2014 | El-Najjar et al. | |
| 2015/0087325 A1* | 3/2015 | Nuss | H04W 28/08 455/453 |
| 2015/0146646 A1 | 5/2015 | Chen et al. | |
| 2016/0050587 A1* | 2/2016 | Lam | H04W 28/08 370/235 |
| 2017/0208526 A1 | 7/2017 | Madan et al. | |
| 2017/0238211 A1 | 8/2017 | El-Najjar et al. | |
| 2018/0041921 A1 | 2/2018 | Kojima | |

OTHER PUBLICATIONS

I. Siomina, P. Varbrand, and D. Yuan, "Automated optimization of service coverage and base station antenna configuration in umts networks," Wireless Communications, IEEE, vol. 13, No. 6, pp. 16-25, Dec. 2006.
H. Yousefi'zadeh, A. Habibi, X. Li, H. Jafarkhani, and C. Bauer, "A statistical study of loss-delay tradeoff for red queues," Communications, IEEE Transactions on, vol. 60, No. 7, pp. 1966-1974, Jul. 2012.
Y. T. Lee and A. Sidford, "Efficient accelerated coordinate descent methods and faster algorithms for solving linear systems," in Foundations of Computer Science (FOCS), 2013 IEEE 54th Annual Symposium on, Oct. 2013, pp. 147-156.
M. Garcia-Lozano, S. Ruiz, and J. Olmos, "Umts optimum cell load balancing for inhomogeneous traffic patterns," in Vehicular Technology Conference, 2004. VTC2004—Fall. 2004 IEEE 60th, vol. 2, Sep. 2004, pp. 909-913 vol. 2.
S. McLoone, M. Brown, G. Irwin, and G. Lightbody, "A hybrid linear/nonlinear training algorithm for feedforward neural networks," Neural Networks, IEEE Transactions on, vol. 9, No. 4, pp. 669-684, Jul. 1998.
S. McLoone, V. Asirvadam, and G. Irwin, "A memory optimal bfgs neural network training algorithm," in Neural Networks, 2002. IJCNN '02. Proceedings of the 2002 International Joint Conference on, vol. 1, 2002, pp. 513-518.
M. Wu and L. Chen, "Image recognition based on deep learning," in Chinese Automation Congress (CAC), 2015, Nov. 2015, pp. 542-546.
P. Kuang, W.-N. Cao, and Q. Wu, "Preview on structures and algorithms of deep learning," in Wavelet Active Media Technology and Information Processing (ICCWAMPTIP), 2014 11th International Computer Conference on, Dec. 2014, pp. 176-179.
H. Yousefi'zadeh and E. Jonckheere, "Dynamic neural-based buffer management for queuing systems with self-similar characteristics," Neural Networks, IEEE Transactions on, vol. 16, No. 5, pp. 1163-1173, Sep. 2005.
X. Bin Li and X.-L. Yu, "Influence of sample size on prediction of animal phenotype value using back-propagation artificial neural network with variable hidden neurons," in Computational Intelligence and Software Engineering, 2009. CiSE 2009. International Conference on, Dec. 2009, pp. 1-4.
V. Garg and R. Bansal, "Comparison of neural network back propagation algorithms for early detection of sleep disorders," in Computer Engineering and Applications (ICACEA), 2015 International Conference on Advances in, Mar. 2015, pp. 71-75.
M. Apostolopoulou, D. Sotiropoulos, I. Livieris, and P. Pintelas, "A memoryless bfgs neural network training algorithm," in Industrial Informatics, 2009. INDIN 2009. 7th IEEE International Conference on, Jun. 2009, pp. 216-221.
S. Fahlman, An Empirical Study of Learning Speed in Back-Propagation Networks. Technical Report CMU-CS-88-162, Carnegie Mellon University, 1988.
A. F. C. Hurtado. (Oct. 2005) Umts capacity simulation study, master of science in telematics thesis.
I. Necoara, "A random coordinate descent method for large-scale resource allocation problems," in Decision and control (CDC), 2012 IEEE 51st Annual Conference on, Dec. 2012, pp. 4474-4479.
B. Wah, Y. Chen, and A. Wan, "Constrained global optimization by constraint partitioning and simulated annealing," in Tools with Artificial Intelligence, 2006. ICTAI '06. 18th IEEE International Conference on, Nov. 2006, pp. 265-274.
Y. Cui, K. Xu, J.Wu Z. Yu, and Y. Zhao, "Multi-constrained routing based on simulated annealing," in communications, 2003. ICC '03. IEEE International Conference on, vol. 3, May 2003, pp. 1718-1722 vol. 3.
R. Zeineldin, "An improved simulated annealing approach for solving the constrained optimization problems," in Informatics and Systems (INFOS), 2012 8th International Conference on, May 2012, pp. BIO-27-BIO-31.
B. Wah and T. Wang, "Constrained simulated annealing with applications in nonlinear continuous constrained global optimization," in Tools with Artificial Intelligence, 1999. Proceedings. 11th IEEE International Conference on, 1999, pp. 381-388.
H. Singh, A. Isaacs, T. Ray, and W. Smith, "A simulated annealing algorithm for constrained multi-objective optimization," in Evolutionary Computation, 2008. CEC 2008. (IEEE World Congress on Computational Intelligence). IEEE Congress on, Jun. 2008, pp. 1655-1662.
S. Mohammadi, C. Shang, Z. Ouhib, T. Leventouri, and G. Kalantzis, "A computational study on different penalty approaches for constrained optimization in radiation therapy treatment planning with a simulated annealing algorithm," in Software Engineering, Artificial Intelligence, Networking and Parallel/Distributed Computing (SNPD), 2015 16th IEEE/ACIS International Conference on, Jun. 2015, pp. 1-6.
X. Yao, X. Liu, G. Hu, and F. Qian, "Link delay inference based on simulated annealing constrained optimization method," in Wireless, Mobile and Multimedia Networks, 2006 IET International Conference on, Nov. 2006, pp. 1-4.
Y. Kim and M. Lee, "Scheduling multi-channel and multi-timeslot in time constrained wireless sensor networks via simulated annealing and particle swarm optimization," Communications Magazine, IEEE, vol. 52, No. 1, pp. 122-129, Jan. 2014.
E.-G. Talbi and T. Muntean, "Hill-climbing, simulated annealing and genetic algorithms: a comparative study and application to the mapping problem," in System Sciences, 1993, Proceeding of the Twenty-Sixth Hawaii International conference on, vol. ii, Jan. 1993, pp. 565-573 vol. 2.
R. Qi and S. Zhou, "Simulated annealing partitioning: An algorithm for optimizing grouping in cancer data," in Data Mining Workshops (ICDMW), 2013 IEEE 13th International Conference on, Dec. 2013, pp. 281-286.

(56) References Cited

OTHER PUBLICATIONS

B. Hajek, "Cooling shcedules for optimal annealing," Operations Research, May 1988.

P. Tseng, "Convergence of a block coordinate descent method for nondifferentiable minimization," Journal of Optimization Theory and Applications, Jun. 2001.

A. Beck and L. Tetruashvili, "On the convergence of block coordinate descent type methods," SIAM Journal on Optimization, Jan. 2013.

Y. B. Ian Goodfellow and A. Courville, Deep Learning, 2016, book in preparation for MIT Press. [Online]. Available: http://goodfeli.github.io/dlbook/ (2014). [Online]. Available: http://www.deeplearningbook.org/version-2015-11-16/contents.ml.html.

Mishra et al., "Load Balancing Optimization in LTE/LTE-A Cellular Networks: A Review", Dec. 2014, Amity school of Engineering and Technology (Year: 2014).

Sharma et al., "Automated W-CDMA Mircrocellular Deployment and Coverage Reconfiguration based on Situation Awareness", May 2002, Centre for Communications Research, University of Bristol (Year: 2002).

\* cited by examiner

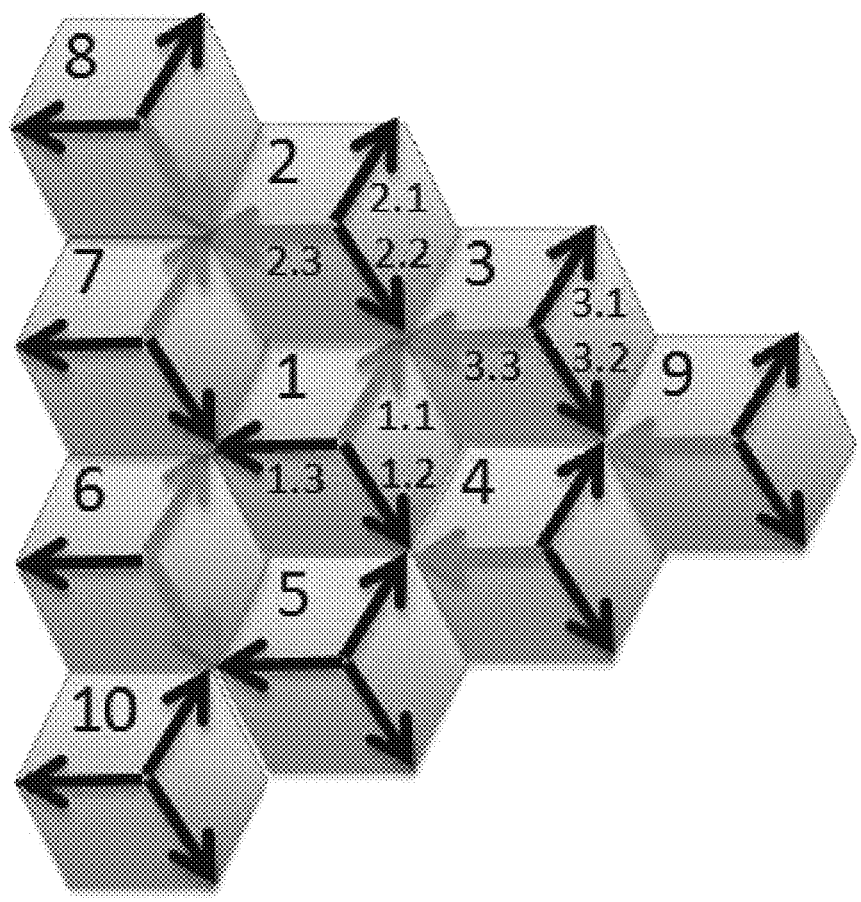
FIG. 1: A typical downtown cellular network cluster comprised of ten sites with each site having three cellular towers.

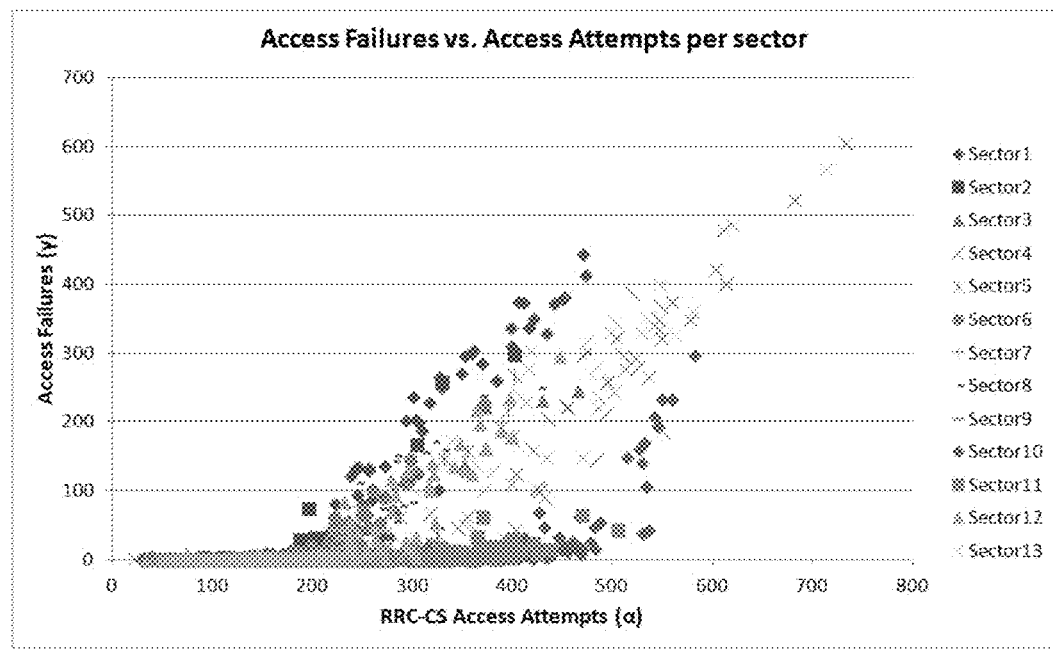
FIG. 2: Sample drawings of CS access failures $\gamma_i$ versus RRC access attempts $\alpha_i$ illustrating break points vary.

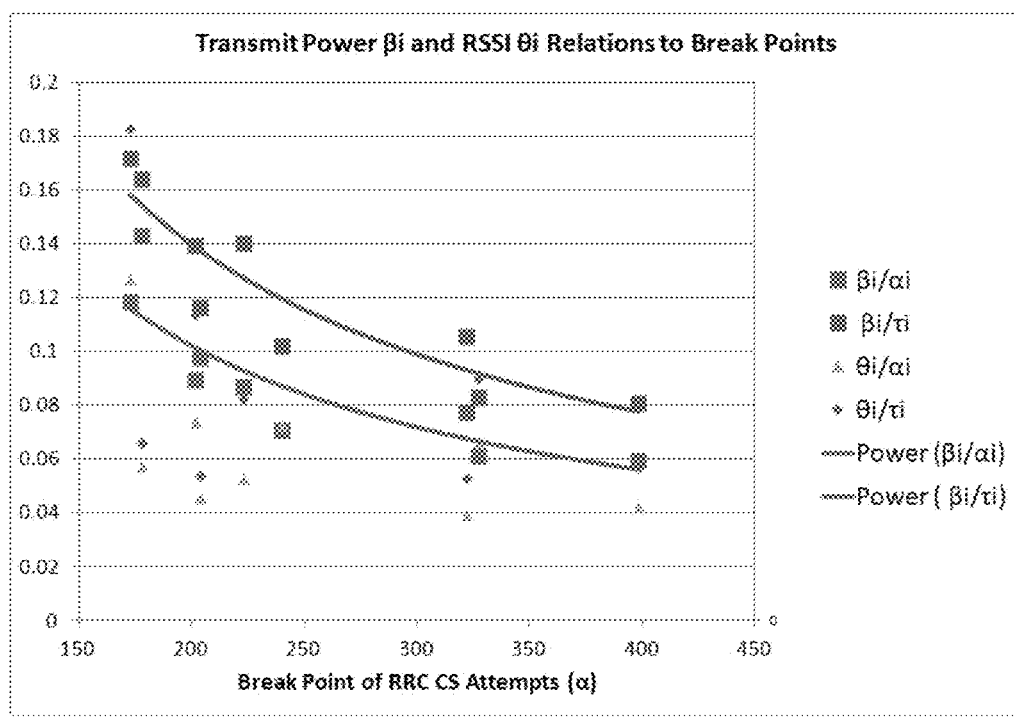
FIG. 3 The relationship between breakpoints and various values of $\beta_i/\alpha_i$, $\beta_i/\tau_i$, $\theta_i/\alpha_i$ and $\theta_i/\tau_i$.

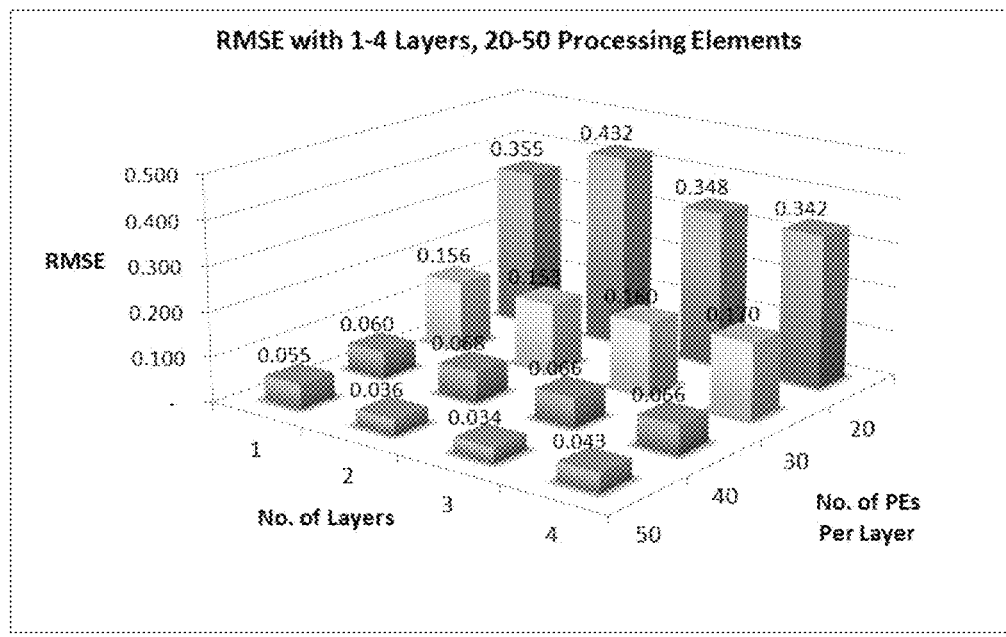
FIG. 4: An illustration of how RMSE decreases as the number of processing elements per layer increases.

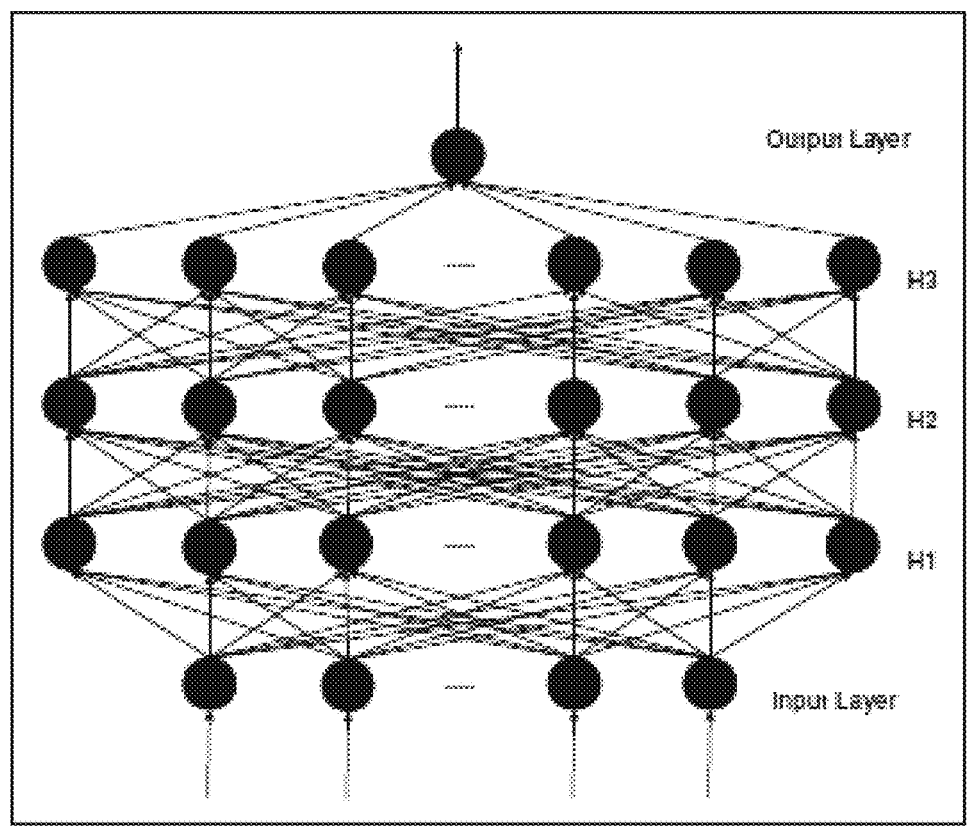
FIG. 5: An illustration of the fixed, fully connected, feedforward perceptron MLPDL structure utilized for predicting cellular towers' breakpoints.

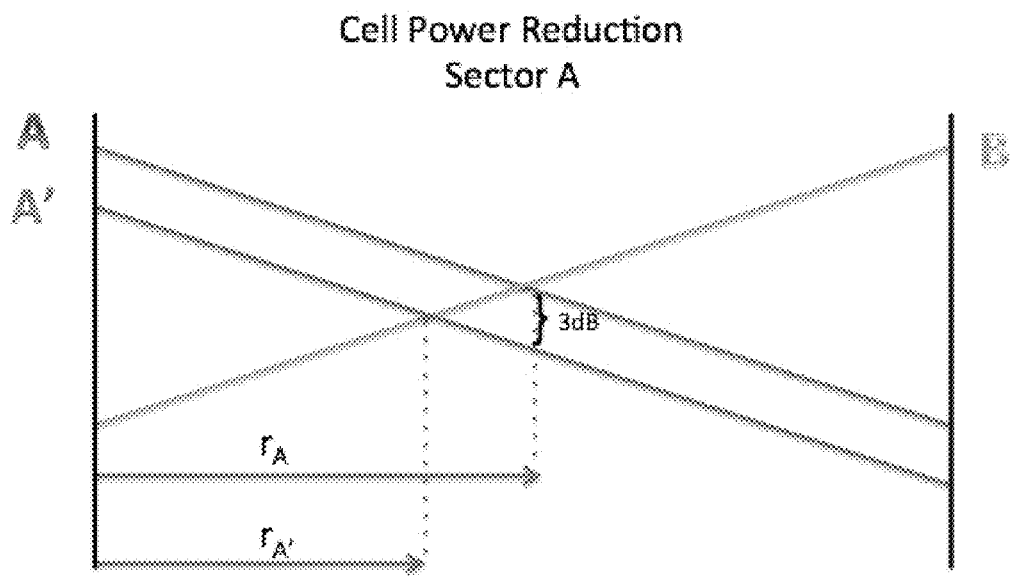
FIG. 6 The impact of changing CPiCH power $\Omega_A$ for cell A on reducing cell A coverage radius.
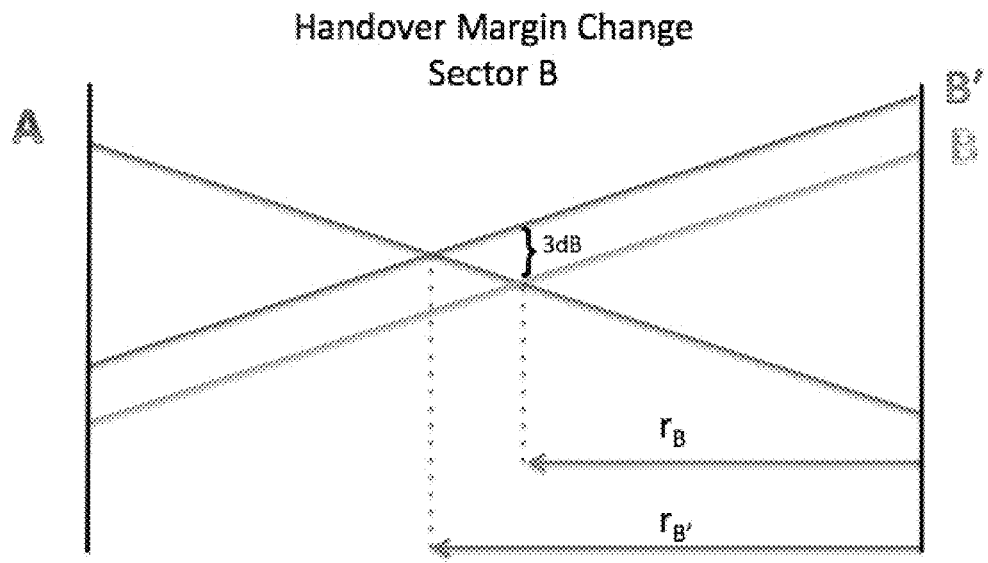
FIG. 7 The impact of changing CIO $\Phi_B$ for cell B on reducing cell A coverage radius.

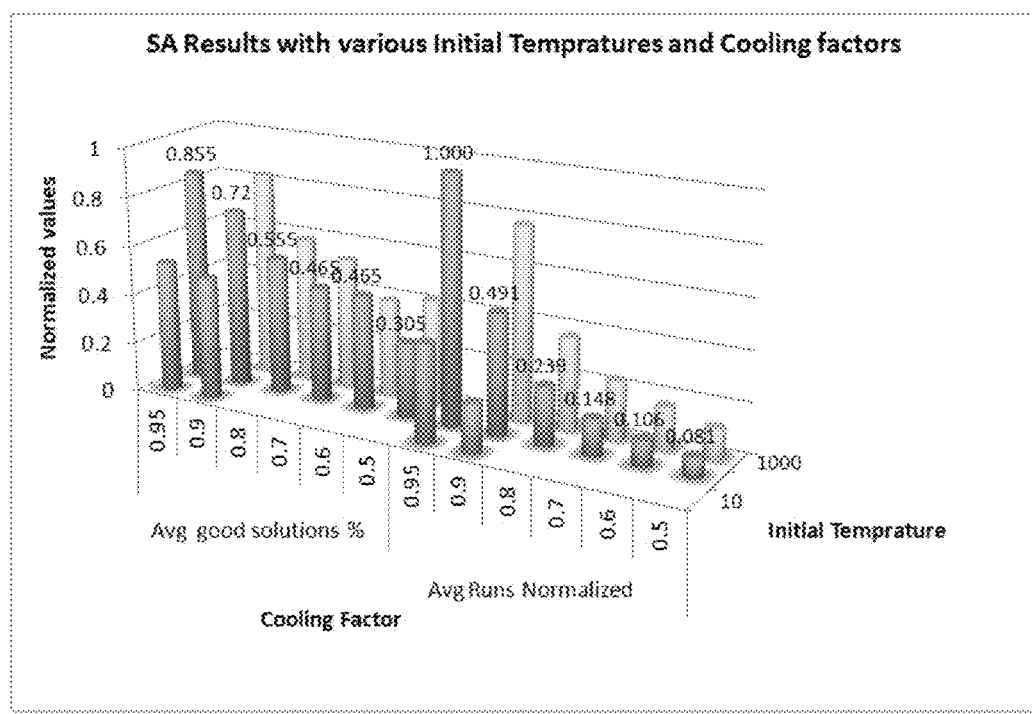
FIG. 8: SA results showing an initial temperature of 100 and a cooling factor of 0.9 address the tradeoff between accuracy of finding good utility values and runtimes.

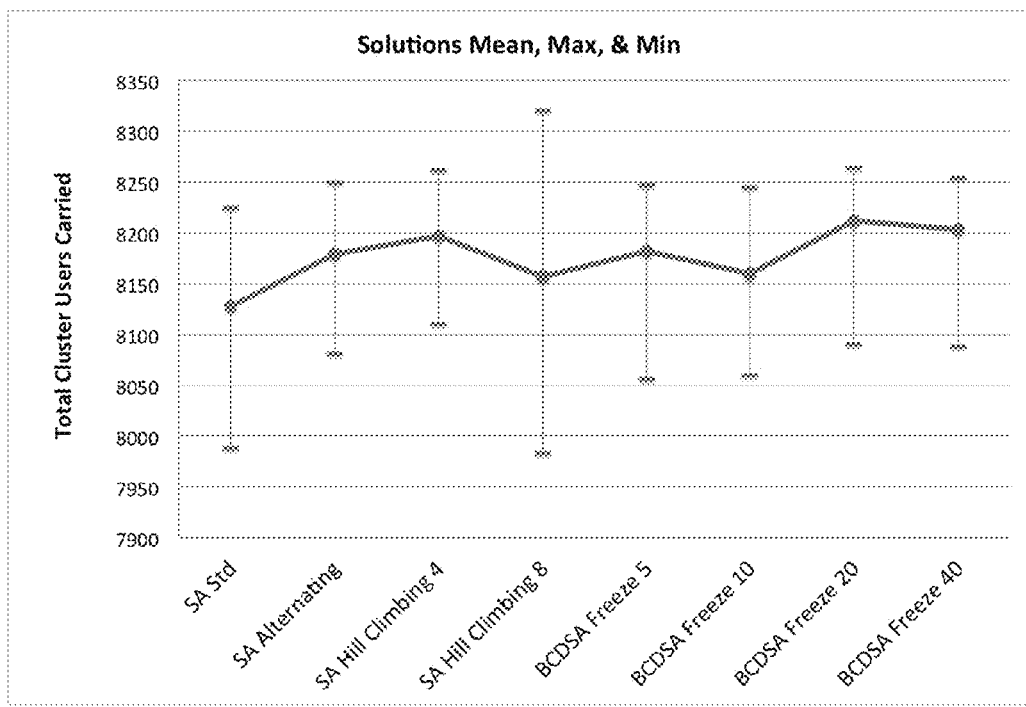
FIG. 9: A comparison of mean, maximum, and minimum values of the traffic carried by different algorithms within the cluster of our study.

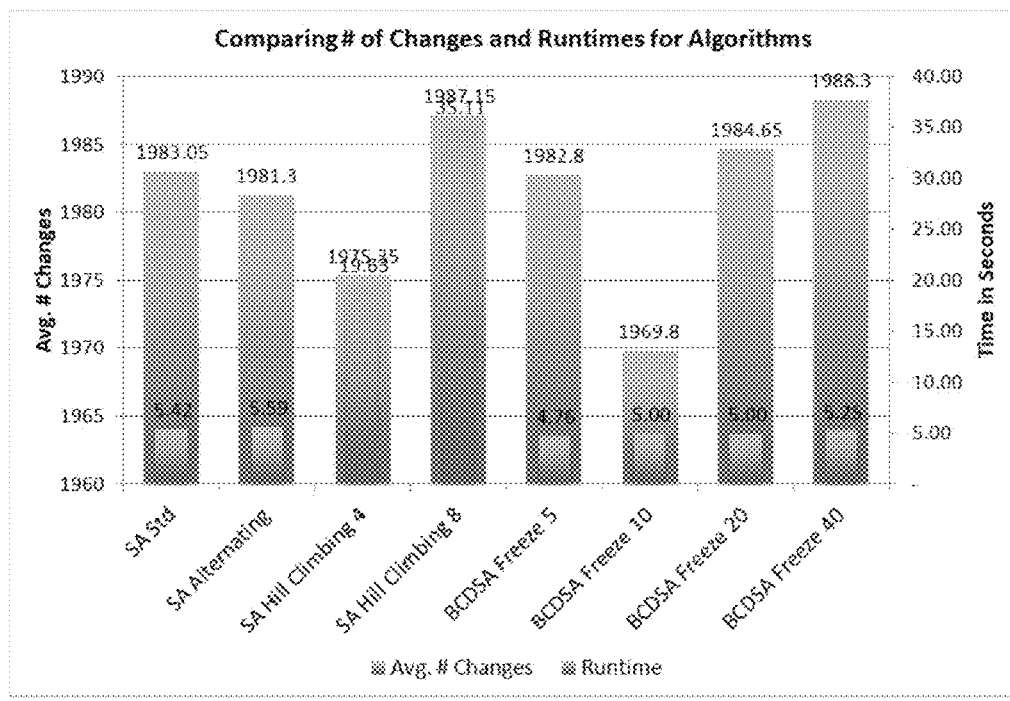
FIG. 10: A comparison of average number of changes per temperature point and runtimes of different algorithms.

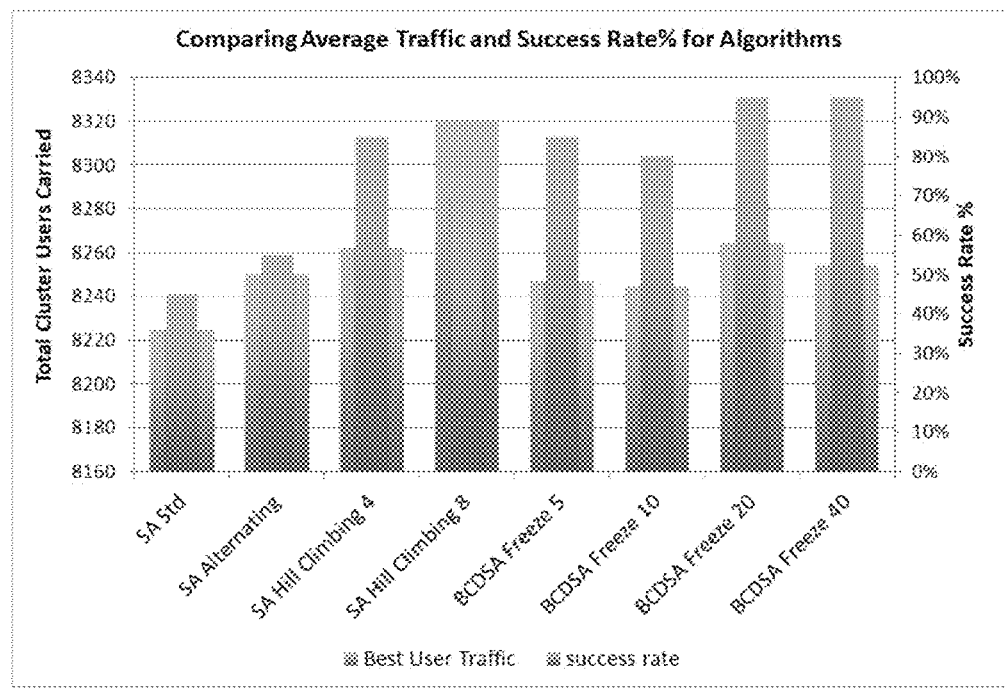
FIG. 11: A comparison of the highest number of users carried and success rate percentage for different algorithms.

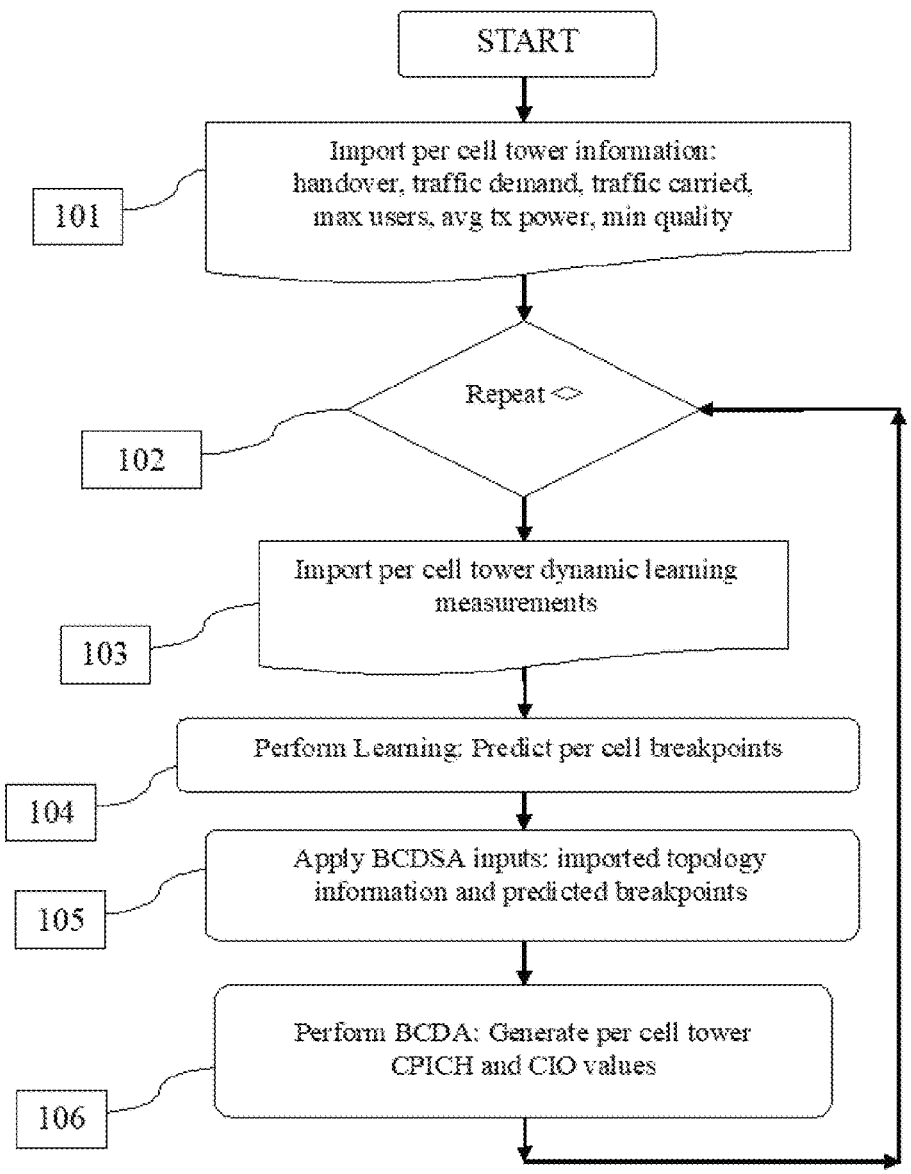
FIG. 12 An exemplary flowchart of the present invention.

CAPACITY AUGMENTATION OF 3G CELLULAR NETWORKS: A DEEP LEARNING APPROACH

FIELD OF THE INVENTION

The present invention relates to methods, programs, and systems for improving the capacity of a 3G cellular network, in particular, an automatic redistribution of traffic from congested cellular towers to their neighboring non-congested cellular towers.

BACKGROUND OF THE INVENTION

Maximizing the number of served users while maintaining an acceptable Quality of Service (QoS) is always a serious challenge in the operation of cellular networks. Considerable effort has been excerpted by standards groups of 3GPP as well as equipment vendors research teams, chip makers, operations research groups, and network operators to handle this challenge. The capacity challenge in cellular networks stems from various sources depending on technology and access techniques.

In broadband 3G standards deployed by Code Division Multiple Access (CDMA) and Universal Mobile Telecommunications Service (UMTS) cellular networks, the main factors affecting capacity are power, interference, and processing hardware elements. The real challenge in such systems is to control downlink and uplink power consumption in order to a) ensure base stations do not run out of power when feeding downlink power amplifiers, and b) prevent noise rise on uplinks causing access failures. Considerable research has been conducted on power control algorithms to address the challenge [8,9]. Such efforts have mostly focused on mobile handsets, Base Transceiver Stations (BTS) and UMTS Base Stations (NodeB), Base Station Controllers (BSC), and Radio Network Controllers (RNC) software that make power control decisions. However, most of these algorithms focus on the behavior of individual elements and the associated impact on quality and capacity of individual elements.

In practice, network operators concern themselves to make sure a cluster of sites serving a specific geographical area such as a large urban downtown are performing well when delivering proper capacity and quality to mobile users. In order to optimize the operation of a cluster of cells, traffic has to be offloaded from more congested cells to less congested cells. 3G traffic offloading can be achieved in several ways such as changing the Common Control Pilot CHannel (CPiCH) power of a cell i referred to as $\Omega_i$, tilt of antennas, azimuth of cells, handover thresholds, etc. [10,11]. In reality, such changes may be effective for static network configurations relying on manual changes made by network engineers monitoring and assessing the impact. Further, some changes such as changing azimuth or tilt of the antennas take effect slowly and are yet very costly. They also require proper knowledge of the location of users such that the change does not have a negative impact on user coverage. To that end, some attempts were made to change $\Omega_i$ power and tilt [8], [9] while others utilized Cell Individual Offset (CIO) of a cell i referred to as $\Phi_i$ [12] to redistribute traffic.

For the foregoing reasons, there is a need to address above-mentioned capacity challenge in 3G cellular networks to dynamically handle traffic distribution according to demand. The main focus of this invention is predicting capacity limits, i.e., breakpoints of cellular towers and providing a dynamic automated solution that significantly improves capacity.

The phrases cell, cell tower, and cellular tower are used interchangeably in the disclosure of this invention.

BRIEF SUMMARY OF THE INVENTION

The subject disclosure features a method that effectively predicts capacity limits, i.e., breakpoints of 3G cellular towers and provides a dynamic automated solution that significantly improves the capacity of such networks by redistributing traffic from congested cells to the non-congested cells automatically.

In an embodiment illustrated by FIG. 1, cellular network is a three-tiered network. The cellular network comprises clusters that comprise sites, and the sites comprise cellular towers. The cellular network may comprise one or more clusters of sites. The cluster may comprise a plurality of sites, for instance, ten sites. Each site may comprise a plurality of cellular towers, such as three cellular towers. Each cluster may comprise a plurality of cellular towers, for example, 30 cellular towers.

An embodiment of the present invention comprises a multi-layer perceptron deep learning technique that can be iteratively trained by real network measurement data collected from 3G cellular towers to accurately predict breakpoints of cellular towers.

In an embodiment illustrated by FIG. 5, MLPDL structure comprises an input layer, a number of hidden layers, and an output layer. The input layer may comprise eight processing elements. Said structure may contain four hidden layers with each hidden layer comprising twenty processing elements. The output layer may comprise a single processing element.

In an embodiment, MLPDL technique can improve accuracy of finding breakpoints. In such embodiment, accuracy of breakpoint prediction is determined based on calculating the error between the output of MLPDL and the actual measured quantity. In a preferred embodiment, root mean square error is used for calculating output error. In such embodiment, output error decreases as the number of input measurements increases per cellular tower.

A further embodiment of the present invention comprises a detailed formulation of an optimization problem with the objective of maximizing the overall capacity of a collection of cellular towers covering an area of interest through traffic offloading and subject to constraints associated with predicted breakpoints of cellular towers as well as minimum quality thresholds experienced by mobile users.

Additional embodiments of the present invention feature solving this optimization problem using a number of variants of Simulated Annealing (SA) technique among which there is a variant inspired by Block Coordinated Descent (BCD) [13], [14] and referred to as Block Coordinated Descent Simulated Annealing (BCDSA).

In one embodiment, adjusting CPiCH power or CIO handover threshold of individual cellular towers results in shifting cellular tower borders, redistributing traffic from congested cellular towers to non-congested cellular towers, and reducing congestion.

In an embodiment, BCDSA algorithm described in Algorithm 2 provides an automatic iterative process to reduce congestion and optimize the capacity of a 3G cellular network by applying changes to two sets of decision variables, i.e., CPiCH power and CIO handover threshold of cellular towers. In such embodiment, BCDSA algorithm applies changes to one set of decision variables at a time while keeping the other set fixed at that time. Then, it alternates between the set of the CPiCH and the CIO decision variables based on freeze thresholds.

Such embodiment of BCDSA algorithm offers more reliable and higher efficiency solutions than other embodiments comprising standard simulated annealing and hill climbing algorithms for traffic redistribution.

In an integrated embodiment illustrated by FIG. 12, the present invention features a method to improve capacity of a 3G cellular network. The method may comprise:

importing per cellular tower information (101) including neighbor handover, traffic demand, traffic carried, average transmit power, and minimum acceptable quality;

waiting for the expiration of a refresh timer (102);

importing collected learning measurements since the beginning till the last period (103) upon expiration of said refresh timer;

applying a Machine Learning Regression and a Multi-Layer Perceptron Deep Learning (MLPDL) (104) technique to predict individual breakpoints of the plurality of cellular towers, wherein a breakpoint reflects the maximum load limit of associated cellular tower;

applying the inputs to BCDSA algorithm (105), i.e., imported topology information and predicted breakpoints;

performing BCDSA algorithm (106) to redistribute traffic as the result of changing CPiCH power and CIO handover thresholds of the plurality of cells to effectively redistribute traffic from a congested cells to non-congested cells thereby optimally improving the capacity of the cellular network;

going back to step (102) to wait again for the expiration of said refresh timer.

In another integrated embodiment illustrated by FIG. 12, the present invention features a computer program product stored in a computer readable non-volatile and volatile storage medium. The computer program in capable of improving capacity of a 3G cellular network. In one embodiment, the computer program may comprise:

code for importing per cellular tower information (101) including neighbor handover, traffic demand, traffic carried, average transmit power, and minimum acceptable quality;

code to wait for the expiration of a refresh timer (102);

code for importing collected learning measurements since the beginning till the last period (103) upon expiration of said refresh timer;

code for applying an MLPDL (104) technique to predict individual breakpoints of the plurality of cellular towers, wherein a breakpoint reflects the maximum load limit of associated cellular tower;

code for applying the inputs to BCDSA algorithm (105), i.e., imported topology information and predicted breakpoints;

code for performing BCDSA algorithm (106) to redistribute traffic as the result of changing CPiCH power and CIO handover thresholds of the plurality of cells to effectively redistribute traffic from a congested cells to non-congested cells thereby optimally improving the capacity of the cellular network;

code for going back to step (102) to wait again for the expiration of said refresh timer.

In yet a further integrated embodiment illustrated by FIG. 12, the present invention features a system for improving capacity of a 3G cellular network. The system may comprise a processor, and a memory coupled to the processor, the memory stores instructions readable by a computing device that, when executed by the processor, cause the processor to perform operations. The operations may comprise:

importing per cellular tower information (101) including neighbor handover, traffic demand, traffic carried, average transmit power, and minimum acceptable quality;

waiting for the expiration of a refresh timer (102);

importing collected learning measurements since the beginning till the last period (103) upon expiration of said refresh timer;

applying an MLPDL (104) technique to predict individual breakpoints of the plurality of cellular towers, wherein a breakpoint reflects the maximum load limit of associated cellular tower;

applying the inputs to BCDSA algorithm (105), i.e., imported topology information and predicted breakpoints;

performing BCDSA algorithm (106) to redistribute traffic as the result of changing CPiCH power and CIO handover thresholds of the plurality of cells to effectively redistribute traffic from a congested cells to non-congested cells thereby optimally improving the capacity of the cellular network;

going back to step (102) to wait again for the expiration of said refresh timer.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE ALGORITHMS

Algorithm 1 contains a description of constrained simulated annealing algorithm.

Algorithm 2 contains a description of block coordinated descent simulated annealing algorithm.

BRIEF DESCRIPTION OF THE DRAWINGS

FIG. 1 shows a typical downtown cellular network cluster comprised of ten sites with each site having three cellular towers.

FIG. 2 illustrates sample drawings of CS access failures $\gamma_i$ versus RRC access attempts $\alpha_i$ illustrating break points vary.

FIG. 3 shows the relationship between breakpoints and various values of $\beta_i/\alpha_i$, $\beta_i/\tau_i$, $\theta_i/\alpha_i$ and $\theta_i/\tau_i$.

FIG. 4 illustrates how RMSE decreases as the number of processing elements per layer increases.

FIG. 5 illustrates the fixed, fully connected, feedforward perceptron MLPDL structure utilized for predicting cellular towers' breakpoints.

FIG. 6 shows the impact of changing cell A CPiCH power on reducing cell A coverage radius.

FIG. 7 shows the impact of changing CIO for cell B on reducing cell A coverage radius.

FIG. 8 illustrates an initial temperature of 100 and a cooling factor of 0.9 addresses the tradeoff between accuracy of finding good utility values and runtimes in SA algorithm.

FIG. 9 shows a comparison of mean, maximum, and minimum values of the traffic carried by different algorithms within the cluster of FIG. 1.

FIG. 10 includes a comparison of average number of changes per temperature point and runtimes of different optimization algorithms.

FIG. 11 provides a comparison of the highest number of users carried and success rate percentage for different optimization algorithms within the cluster of FIG. 1.

FIG. 12 shows an exemplary flowchart of the present invention.

DETAILED DESCRIPTION OF THE INVENTION

In an embodiment of the presented modeling and optimization of capacity algorithms, a 3G cellular network cluster illustrated in FIG. 1 is used. This embodiment represents a typical major US city downtown area. The cluster is comprised of ten sites with each site having three cellular towers covering hundred and twenty degrees and presented by arrows pointing at three different directions. For a given operation scenario, cells in red represent congested cells while cells in black represent non-congested cells.

In some embodiments, the present invention presents a solution to capacity optimization by first predicting the breakpoints of each cell tower thereby avoiding degradation of neighboring cells offered quality as the result of offloading users from congested cells. Utilizing the predicted breakpoints as operational constraints, the optimal configurations of parameters $\Omega_i$ and $\Phi_i$ with $i \in \{1, \ldots, N\}$ that maximize traffic offloading are identified for the plurality of cells within a cluster set. Said configuration parameters satisfy minimum quality thresholds and capacity limits for the plurality of cells. The low complexity of the solution allows it to be embedded into live systems making real time decisions about traffic offloading. Hence, it can operate as an intelligent Self Optimizing Network (iSON). Table 1 provides a listing of notations used in this invention disclosure.

Learning-Based Breakpoint Modeling

Particular network KPIs are modeled based on certain input measurements and traffic loading values with the objective of predicting future values of KPIs as the result of increased network traffic loads. The KPI of interest is circuit switched access and voice access failures of

TABLE 1

Table of notations used in this invention disclosure.

| | |
|---|---|
| $C_\gamma$ | Total capacity measured as total number of users carried |
| I | Set of all 3G cells within the cluster |
| N | The number of cells within set I |
| i | Cell index |
| $C_i$ | Maximum capacity of cell i identified by learning algorithm |
| $\Omega_i$ | Common Control Pilot CHannel (CPiCH) power of cell i |
| $\Phi_i$ | Cell Individual Offset (CIO) of cell i |
| $x_i$ | Ordered pair setting $(\Omega_i, \Phi_i)$ for cell i |
| $\underline{x}$ | Vector of elements $(x_1, \ldots, x_N)$ |
| $c_i$ | Current measured traffic carried by cell i |
| $c_i\Omega$ | Traffic offload of cell i due to reducing CPiCH power |
| $\Psi_i$ | Traffic offload due to border shift after power reduction of cell i |
| $c_{i,j}^\Phi$ | Traffic offload from cell i due to reducing CIO in cell j |
| $\eta_{i,j}$ | Overlap percentage between cell i and its neighbor j |
| $\Gamma_i$ | Traffic offload from cell i to cell j after changing $\Phi_j$ |
| $q_i$ | Quality of cell i |
| Q | Minimum allowed quality of a cell |
| $\gamma_i$ | Voice or circuit switched access failures of cell i |
| $\tau_i$ | Voice traffic loading of cell i in Erlang |
| $\mu_i$ | Carried data volume of cell i in MB |
| $\alpha_i$ | Radio Resource Connection Circuit Switched (RRC-CS) or voice access attempts of cell i |
| $\psi_i$ | Radio Resource Connection Packet Switched (RRC-PS) attempts of cell i |

TABLE 1-continued

Table of notations used in this invention disclosure.

| | |
|---|---|
| $\beta_i$ | Downlink transmit power of cell i or TX-PWR |
| $\theta_i$ | Uplink Received Signal Strength Indicator (RSSI) of cell i |
| $\lambda_i$ | Average transmit power per user $\beta_i/\tau_i$ of cell i |
| $\nu_i$ | Adjusted downlink received signal strength at the edge of cell i |
| $\Pi_i$ | Total path loss of cell i |
| $\delta_i$ | Penalty of violating cell i quality and capacity constraints |
| $\tilde{C}_\gamma$ | Penalty-augmented $C_\gamma$ due to violating all per cell quality and capacity constraints |
| $\phi$ | Reduction ratio of energy per bit divided by noise $(E_b/N_t)$ |
| $\xi$ | Freeze count measure of simulated annealing algorithm |
| m | No. of search attempts in simulated annealing algorithm |
| T | Temperature of simulated annealing algorithm |
| $T_i$ | Initial temperature of simulated annealing algorithm |
| $T_f$ | Final temperature of simulated annealing algorithm |
| a | Cooling factor of simulated annealing algorithm |
| $\rho$ | Multiplier of N controlling the number of iterations at each temperature point of simulated annealing algorithm |
| $\sigma$ | Number of times the temperature will be cooled down in simulated annealing algorithm |
| B | Boltzman constant |
| R | Random number derived from uniform distribution U [0, 1] |
| U | Unit step function | cell i denoted by $\gamma_i$. Described in Table 1, the input measurements include voice traffic loading $\tau_i$ in Erlang, carried data volume $\mu_i$ in MB, RRC-CS-Attempts $\alpha_i$, RRC-PS-Attempts $\psi_i$, transmit power $\beta_i$, and RSSI $\theta_i$. In an evaluation embodiment, these KPIs and measurements were collected from a major operator's database of cell-by-cell measurements for a period of four weeks starting on Oct. 16, 2013 and ending on Nov. 14, 2013.

The goal is to be able to detect the breakpoint of each cells based on the observed behavior of similar cells and using a learning system. FIG. 2 illustrates such behavior, i.e., plots of $\gamma_i$ as a function of $\alpha_i$ for a number of cells. Each cell is presented with a different colored line in the figure. As shown, cells will have no failures until reaching a certain threshold of RRC-CS-Attempts $\alpha_i$ at which point they exhibit failures. The breakpoint of each cell is unique and depends on a number of inputs. The purpose of utilizing a learning algorithm is then to capture the effects of such inputs. It is seen in FIG. 2 that some cells start rejecting additional call attempts causing access failures as early as 200 attempts, but other cells can take up to 400 or even 500 attempts before having access failures. In what follows, a couple of learning approaches are explored to predict the breakpoints of the underlying cells.

Machine Learning

In an embodiment, learning approach conducts an analysis to characterize the breakpoint behavior of cell i using a softplus function as described in the equation below.

$$\gamma_i = \log\left[1 + \exp(\alpha_i - C_i)\right] \quad (1)$$

Hence given $\alpha_i$, identifying $\gamma_i$ is equivalent to identifying $C_i$. In essence, $C_i$ is identified as the value of $\alpha_i$ at which $\gamma_i$ departs from a value of zero associated with access failures due to high traffic loads. Then, the measured breakpoint $C_i$ is compared to other measurements in order to identify possible correlations. The measurements of interest include the ratios TX-PWR/Erlang (User) $\beta_i/\tau_i$, TX-PWR/RRC-CS-Attempts $\beta_i/\alpha_i$, RSSI/Erlang (User) $\theta_i/\tau_i$, and RSSI/RRC-CS-Attempts $\theta_i/\alpha_i$. As seen in the curves of FIG. 3, some of the measured parameters seem to be closely correlated with the observed breakpoints, especially, the ratio TX-PWR/Erlang (User) $\beta_i/\tau_i$. Eq. (2) below expresses $C_i$ the maximum capacity of cell i identified by learning algorithm as a function of measured quantities where $\underline{w}_i^T$ is the vector of regression coefficients and vector $\underline{G}_i$ is identified as a function of its arguments.

$$C_i = \underline{w}_i^T \cdot \underline{G}\left(\frac{\beta_i}{\tau_i}, \frac{\beta_i}{\alpha_i}, \frac{\theta_i}{\tau_i}, \frac{\theta_i}{\alpha_i}\right) \quad (2)$$

This can be clearly explained considering the fact that as the ratio $\beta_i/\tau_i$ is increased, the power of the power amplifier of NodeB in UMTS 3G runs out quicker causing access failures for new users attempting to access the cell. The ratio $\beta_i/\tau_i$ is a unique per cell characteristic reflecting the average amount of power needed by users due to the unique configuration of the cell. For example, cells serving users close by have relatively low transmit powers allowing them to serve a larger number of users before running out of resources. To the contrary, cells serving users that are far away or inside buildings will need to have higher powers in order to reach those users and hence run out of power resources much faster. Machine Learning (ML) and in particular linear regression curve fitting are used to model these curves.

In an embodiment, the goal of ML is to minimize the Mean Square Error (MSE) or Root Mean Square Error (RMSE) defined below between predicted values $\hat{C}_i$ and measured values $C_i$ of the training samples by calculating the coefficient vector $\underline{w}_i^T$ [16].

$$RMSE = \left[\frac{1}{N}\sum_{i=1}^{N}\left(\hat{C}_i - C_i\right)^2\right]^{\frac{1}{2}} \quad (3)$$

It is easy to model cells that have reached breakpoints before by detecting those breakage points as a function of loading. The real challenge in cellular networks is to accurately predict the breakage points of cells that have never reached those points before. This invention manages to find the factors that characterize the behavior of a specific cell and hence its unique breakage point. This is mainly what was explained earlier as power used per user in the downlink $\beta_i/\tau_i$ as well as noise rise per user $\theta_i/\tau_i$.

In order to examine how accurately breakpoints are predicted, a model is built in an embodiment using 9 cells as the training set with actual breakpoints. From that, the model is applied to a test set of 4 cells, but the data used is for samples taken well before reaching the breakpoint. This is equivalent to applying models to cells that never reached breakpoints before except that in this case, the actual breakpoints of these 4 cells are known and hence it is possible to compare predicted and measured breakpoints.

The results are shown in Table 2. Error ranges of 3% to 9% are observed with the exception of one cell at a 15% error which is due to special events impacting the loading of that cell.

TABLE 2

Actual versus predicted breakpoints using regression.

| Cell | Actual BP | Predicted BP | Error |
|---|---|---|---|
| Cell 3 | 278 | 304.83 | 9.65% |
| Cell 6 | 174 | 168.32 | -3.26% |
| Cell 9 | 182 | 153.92 | -15.42% |
| Cell 12 | 221 | 213.46 | -3.40% |

Multi-Layer Perceptron Deep Learning

In another embodiment, an alternative approach to modeling $\gamma_i$ and how it relates to other collected measurements are described. The main reason for introducing the alternative modeling approach is to avoid relying on the trial and error approach of choosing inputs and patterns as needed in the machine learning approach. It is also important to note that said alternative modeling approach is able to model $\gamma_i$ as a function of $\alpha_i$ including the associated breakpoint as oppose to the machine learning modeling approach only identifying the associated breakpoint. Then considering $\gamma_i$ as a function of $\alpha_i$ in Eq. (1), $C_i$ is identified as the value of $\alpha_i$ at which $\gamma_i$ departs from zero.

Multi-layer perceptron deep leaning presented in [17, 18] has proven to be very effective in solving complex learning problems, especially, pattern recognition [19]. In the learning approach, supervised MLPDL is used to model 3G cellular networks' behavior and predict KPIs as the result of traffic loading increase based on deep learning techniques presented in [20, 21].

MLPDL replaces the analytical difficulties encountered in other modeling approaches with a straightforward computational learning algorithm [22]. Said approach simply takes advantage of a fixed structure nonlinear system with a well defined analytical model capable of predicting KPIs based on measurements. As illustrated by FIG. 5, the fixed, fully connected, feedforward perceptron MLPDL structure utilized by an embodiment of this invention consists of an input layer with up to eight processing elements, two to four hidden layers with twenty processing elements in each layer, and an output layer with one processing element. In each iteration of learning, the current input is propagated in the forward direction through hidden layers to generate an output. The output error is then propagated in the reverse direction to the input layer in order to adjust weighting functions between every pair of processing elements in adjacent layers. The process is repeated until reaching an acceptable threshold of output error. Reference [23] contains the details of learning in said embodiment.

In said and typical embodiments, the accuracy of learning depends on the complexity of perceptron structure, i.e., the number of layers and processing elements per layer, training, verification, and testing algorithms. Accuracy is also traded against complexity and runtime. FIG. 4 includes illustrations of how RMSE decreases as the number of processing elements per layer increases.

Similar to the results reported in [24], measurement and test results in all embodiments of this invention have shown that having a larger number of input samples in the training set is the most critical factor in improving RMSE error results. However, that comes at the significant cost of increasing runtimes by up to an order of magnitude. Further, increasing the number of hidden layers beyond 4 has a positive impact on improving the RMSE error in the range of [20%, 30%] in some configurations. However, the impact is small compared to an impact of up to 90% associated with changing the number of processing elements. Another critical aspect in using MLPDL is the choice of the back-propagation algorithm. A number of algorithms as presented in [25] are tried. These are namely a) traingdm, a gradient descent with momentum back-propagation, b) traingdx, a gradient descent with momentum and adaptive learning rate backpropagation, c) trainbfg, a Broyden-Fletcher-Goldfarb-Shanno (BFGS) quasi-Newton backpropagation [18, 26], and d) trainlm Levenberg-Marquardt algorithm. Similar to quasi-Newton methods, the Levenberg-Marquardt algorithm was designed to approach second-order training speed without having to compute the Hessian matrix [21, 27]. Having explored the results of various back propagation techniques in different embodiments of this invention, it is observed that the embodiment using Levenberg-Marquardt back propagation learning scheme produces the best results.

In cluster modeling embodiments, the modeling a cluster of cells with the least error using the plurality of training samples from all measurement data is targeted.

The MLPDL structure utilized in an embodiment consists of an input layer with eight processing elements, four hidden layers each with twenty processing elements, and one output layer with a single processing element. In that embodiment, the eight inputs are per cell measurement data of $\tau_i$, $\mu_i$, $\alpha_i$, $\psi_i$, $\beta_i$, $\theta_i$, $\beta_i/\tau_i$, and $\beta_i/\alpha_i$ while the output is $\gamma_i$.

This allows MLPDL to not only capture the combined dynamics of all cells within the cluster set but also to consider correlations in the behavior of similar cells when modeling the breakage point of each cell within the cluster set. Experimenting with other embodiments including two, four, and six processing elements at the input layer of MLPDL reveal that best values of average and minimum RMSEs are resulted considering the computing overhead when eight inputs were used. In the latter case, MLPDL achieves average and minimum RMSE values of 4.4% and 2.75%, respectively.

In some embodiments, major challenges are faced in which transmit power $\beta_i$ present combined measurements of both voice and data services in 3G networks considered in this invention. In 3G UMTS, voice users have a higher priority than data users but both of them share the same power amplifier levels reported as $\beta_i$. In order to address the issue, ML regression analysis is utilized in which available measurements of $\tau_i$, $\mu_i$, $\psi_i$, $\alpha_i$, $\beta_i$ are used to estimate the power of voice and data separately. Then, measured values of $\beta_i$ are scaled according to regression results of voice and data. The latter significantly improves the accuracy of MLPDL algorithm. As shown in Table. 3, the model augmented by regression shows average and minimum RMSE values of 2.9% and 2%, respectively.

TABLE 3

Isolating transmit power of voice and data greatly improves RMSE measurements.

| Inputs | Average RMSE % | Minimum RMSE % |
| --- | --- | --- |
| MLPDL | 4.4% | 2.75% |
| MLPDL & Regression | 2.9% | 2% |

Optimizing Cellular Network Parameters

In additional embodiments, offloading the load of cells operating close to their breakpoints is aimed in order to maximize the capacity of a 3G cellular network cluster. In what follow the formulation of an optimization problem aiming at maximizing the capacity of the cluster is expressed, and three algorithmic embodiments to solve the problem are presented. These embodiments include standard constrained Simulated Annealing (SA), hill climbing SA, and a variant of SA inspired by block coordinated descent optimization referred to as BCDSA.

Problem Description

Maximization of the capacity of a cluster of 3G cellular towers is targeted such that it can carry more users without facing access failures. In 3G UMTS, the radius and hence coverage of a cell i is predominantly controlled by its CPiCH power referred to as $\Omega i$. This channel carries both signaling and control messaging. Increasing CPiCH power increases cell radius, while decreasing it decreases cell radius. Decreasing CPiCH also results in freeing up a portion of the power allocated to the amplifier of eNodeB, which in turn can be used to carry user traffic instead of signaling. Additionally, the CIO of a cell i referred to as $\Phi_i$ controls its coverage at its boundary allowing to to expand or shrink cell foot print and thereby serving more or less user traffic.

The approach calls for a) reducing $\Omega_i$ power of a congested cell i in order to shift traffic to its neighbors and also allocate more power to its own user traffic than signaling traffic, and b) changing the CIO handover threshold $\Phi_j$ of a neighboring cell in order to control handover to it without changing the power of cell i. Both changes result in shifting existing users on cell edges to be served by neighboring cells at slightly lower quality than the quality experienced when connected to the original cell. The quality experienced by a user is typically represented by $E_b/N_t$ directly mapped to Signal to Interference Noise Ratio (SINR).

FIG. 6 illustrates the changes in the received signal strength at a mobile user as the user moves from the vicinity of cellular tower A to that of cellular tower B. The x-axis is the distance of the user from cell tower A to which the user is initially connected, while the y-axis is the user's received signal strength. The blue line labeled A shows that the user's received signal strength from cell A decreases as the distance increases, i.e., as the user travels away from cell A. The green line labeled B shows the user's received signal strength from cell B increases as the distance increases, i.e., as the user travels toward cell B. The intersection point of blue and green lines represents the initial boundary distance point at which the user is handed over from cell A to cell B. The red line labeled A' shows reducing the value of CPiCH power $\Omega_A$ by a sample value of 3 dB shrinks the footprint of cell A from $r_A$ to $r_A'$. The reduction in power shifts the intersection point to the left causing the handover to occur at a shorter distance from cell A where red and green lines cross.

Similarly, FIG. 7 shows the increase in the footprint of cell B from $r_B$ to $r_{B'}$ as the result of increasing the value of CIO $\Phi_B$. Increasing $\Phi_B$ by a sample value of 3 dB shifts the intersection point of the blue line labeled A and the green line labeled B to the left and causes the handover point to occur at a shorter distance from cell A where the blue line labeled A and the red line labeled B' cross. Increasing the value of CIO of cell B results in expanding the footprint of cell B from $r_B$ to $r_{B'}$ and has the same effect as shrinking the effective footprint of cell A.

Problem Formulation

In an embodiment of the invention, the formulated optimization problem is expressed as shown below.

$$\max_{\forall \Omega_i, \Phi_i} C_\Upsilon = \sum_{i \in I} \left[ c_i + c_i^\Omega + \sum_{\substack{j \in I \\ i \neq j}} c_{i,j}^\Phi \right] \quad (4)$$

$$\text{S.T.} \left[ c_i + c_i^\Omega + \sum_{\substack{j \in I \\ i \neq j}} c_{i,j}^\Phi \right] \leq C_i, \quad \forall\, i \in I \quad (5)$$

$$q_i \geq Q, \quad \forall\, i \in I \quad (6)$$

The formulation attempts at maximizing the total cluster capacity $C_\gamma$ by controlling transmit power $\Omega_i$ and CIO $\Phi_i$ on a cell-by-cell basis. The optimization utility function is subject to two constraints. First, the total capacity carried by cell i has to be lower than its maximum available capacity $C_i$ in order to avoid congestion. Second, the quality of cell i denoted by $q_i$ has to meet a minimum acceptable quality threshold of Q explained shortly. The total traffic capacity $C_\gamma$ in Eq. (4) is the summation of three terms associated with all individual cells. These terms for cell i are the current traffic carried by cell i, the change in cell traffic capacity associated with changing power $c_i^\Omega$, and the sum of changes in cell traffic capacity associated with offloading users from cell i to neighboring cells j after changing CIO values of cell j, $c_{i,j}^\Phi$.

In the embodiment above, the optimization problem represents a nonlinear programming problem with a total of 2N decision variables $\Omega_i$ and $\Phi_i$, where $i \in \{1, \ldots, N\}$ and decision variables assume values from discrete sets. Hence, the solution to the problem is not necessarily introducing a trivial utility value of $C_\gamma = \Sigma_i C_i$ due to discrete values of decision variables and also constraint (6).

The change in cell traffic capacity associated with $c_i^\Omega$ is illustrated by Eq. (7) and comprises of the sum of two terms. Both terms can help alleviate the congestion of cell i due to traffic overload.

$$c_i^\Omega = \frac{\Delta\Omega_i}{\lambda_i} + \Psi_i(c_i, \Delta\Omega_i) \quad (7)$$

The first term $$\frac{\Delta\Omega_i}{\lambda_i}$$

captures the lowering CPiCH power $\Omega_i$ of cell i which in turn results in reallocating a portion of the pilot power to carry additional traffic users. It is the ratio of extra power saved from $\Delta\Omega_i$ divided by the average transmit power per user equipment $\lambda_i$ for cell i which is calculated from collected measurement data. The second term $\Psi_i$ represents traffic offload to the neighboring cells as the result of shrinking the footprint of cell i after changing $\Omega_i$.

In order to calculate $\Psi_i$, traffic offload associated with reduction in cell coverage due to cell boundary changes has to be estimated. The total path loss $\Pi_i$ experienced at the boundary of cell i is expressed as a function of $\Omega_i$ and $v_i$, the adjusted downlink received signal strength at the edge of cell i. Accordingly, the path loss $\Pi_i$ is expressed below.

$$\Pi_i = \Omega_i - v_i \quad (8)$$

In a real cell tower, typical values of $v_i$ have to be at a minimum level of −116 dBm after taking into account antenna gains and cable losses.

Next, Hata propagation model [8] is applied to express path loss $\Pi_i$ as a function of distance from cell tower i.

$$\Pi_i = K_1 + K_2 \log r_i \quad (9)$$

In the equation above, $K_1$ and $K_2$ are constants depending on the area and morphology, and $r_i$ is the distance from cell tower i. Typical values of $K_1$ and $K_2$ for urban environments are −35 dB and −40 dB/decade, respectively. For suburban environments, the values are −20 dB and −30 dB/decade, and for rural environments, the values are −10 dB and −20 dB/decade, respectively. Based on the argument above, the distance $r_i$ can be found by comparing the right hand sides of Eq. (8) and Eq. (9) as shown below.

$$r_i = 10^{[(\Omega_i - v_i - K_1)/K_2]} \quad (10)$$

It is observed from Eq. (10) that reducing $\Omega_i$ results in reducing the cell footprint for a fixed value of $v_i$. Assuming the traffic is homogeneously distributed in the serving area [28], a reduction in served traffic proportional to the reduction in area is resulted. Thus, $\Psi_i$ can be calculated as a function of $c_i$ and $\Delta\Omega_i$ as shown below.

$$\Psi_i(c_i, \Delta\Omega_i) = \left[1 - \left(\frac{r_{A'}}{r_A}\right)^2\right] c_i = \left[1 - \left(\frac{10^{[(\Omega_i - \Delta\Omega_i - v_i - K_1)/K_2]}}{10^{[(\Omega_i - v_i - K_1)/K_2]}}\right)^2\right] c_i$$

$$= \left[1 - \left(10^{\frac{-\Delta\Omega_i}{K_2}}\right)^2\right] c_i \quad (11)$$

In an urban environment with a typical cell radius of 1000 m, the radii are found to be $r_A$ associated with ($\Omega_i = 33$) and $r_{A'}$ associated with ($\Omega_i = 30$) for node A as shown in FIG. 6. This results in a reduction of approximately 29% in the serving area and the same percentage reduction in served traffic.

Next, $c_{i,j}^\Phi$ is expressed as a function of $\Gamma_i(c_i, \Delta\Phi_j)$ the amount of traffic offload of cell i to its neighbor j and the area overlap percentage $\eta_{i,j}$ between cells i and j.

$$c_{i,j}^\Phi = \eta_{i,j} \Gamma_i(c_i, \Delta\Phi_j) \quad (12)$$

While the overlap percentage can be calculated from handover statistics on a cell pair basis, $\eta_{i,j}$ is practically set to 40% for front facing neighbors and 10% for co-site neighbors. To understand the definitions of front facing and co-site neighbors, note that in FIG. 1 cell 1.1 has front facing neighbors 2.2 and 3.3, and co-site neighbors 1.2 and 1.3. Similar to $\psi_i(c_i, \Delta\Omega_i)$, the function $\Gamma_i(c_i, \Delta\Phi_j)$ representing traffic offload from cell i to cell j after changing $\Phi_j$ is shown below.

$$\Gamma_i(c_i, \Delta\Phi_j) = \left[1 - \left(10^{\frac{-\Delta\Phi_j}{K_2}}\right)^2\right] c_i \quad (13)$$

Next, quality constraints are discussed. The average quality $q_i$ of cell i after applying new settings is presented as shown below.

$$q_i = \min_j q_{i,j} \quad (14)$$

The impact to quality is mainly associated with the shift of cell boundaries due to $\Delta\Omega_i$, $\Delta\Phi_j$, or the sum of them combined. The combined effect results in shifting users at the edge of cell i to a neighboring cell j where they are served by a weaker signal and with a degraded quality. This shift is calculated for each serving cell i and each of its neighbors j. The worst quality value $q_{i,j}$ is chosen to present the quality of cell i and has to be guaranteed not to be lower than a minimum allowed quality level of Q.

In order to express $q_{i,j}$ as a function of $\Delta\Omega_i$ and $\Delta\Phi_j$, $E_b/N_t$, energy per bit divided by noise total after de-spreading, is chosen as the quality metric presented in [12]. When reducing the serving cell i power $\Omega_i$, say by 3 dB, the boundary of cell i shrinks forcing the users outside that boundary to be served at a lower quality by a neighboring cell. In a typical environment, the users at the boundary of the serving cell typically experience a reduction factor of $\Phi=1.5$ in $E_b/N_t$. Hence, the variations in quality of a user shifted from cell i to a neighboring cell j is expressed as shown below.

$$\Delta(E_b/N_t)_{i,j} = \Phi \cdot (\Delta\Omega_i + \Delta\Phi_j) \quad (15)$$

Consequently, the quality impact is captured as shown below.

$$q_{i,j} = (E_b/N_t)_{i,j} - (E_b/N_t)_{i,j} \quad (16)$$

In a typical embodiment, users at a cell boundary experience a reference $E_b/N_t$ value of 10 dB. Further, a minimum $E_b/N_t$ value of 7 dB is needed in order to support basic voice and data services for covered users [15]. Therefore, Q is set to 7 dB.

Solution Approach

Considering the fact that the formulated problem is a nonlinear optimization problem in which decision variables assume discrete values, a number of algorithmic embodiments of the simulated annealing algorithm are presented to solve the problem after adding a set of penalty terms $\delta_i$ to the objective function [29-31]. Penalty terms are added in order to enforce maximum per cell capacity and quality constraints. The penalty-augmented objective function is then defined below.

$$\tilde{C}_\Upsilon = \sum_{i \in I} \left[ c_i + c_i^\Omega + \sum_{\substack{j \in I \\ i \neq j}} c_{i,j}^\Phi + \delta_i \right] \quad (17)$$

In Eq. (17), $$\delta_i = -[10000\,\mathcal{U}\,(Q-q_i) + (c_i - C_i)\,\mathcal{U}\,(c_i - C_i)] \quad (18)$$

where $\mathcal{U}(.)$ is the unit step function defined below.

$$\mathcal{U}(y) = \begin{cases} 1, & \text{if } y > 0 \\ 0, & \text{Otherwise} \end{cases} \quad (19)$$

It has to be noted that $\delta_i$ is a weighted penalty factor applying a constant hard penalty of 10000 for violating the quality constraint (6) of cell i and a linear soft penalty proportional to the difference of $c_i - C_i$ for violating the capacity constraint (5) of cell i.

Constrained Simulated Annealing (CSA)

In the first algorithmic embodiment, the SA algorithm is described. The SA algorithm seeks to emulate the annealing process in which a solid material already heated up to high temperatures is allowed to slowly cool until it crystallizes. As the temperature is reduced, the energy of the material decreases until a state of minimum energy is achieved. An SA algorithm begins at high temperature values where input values are allowed to have a great range of variations. As the algorithm progresses, temperature is allowed to fall while restricting input variations. This leads the algorithm to improve its current solution similar to the actual annealing process. As long as temperature is being decreased, input variations lead to successively improved solutions and eventually reaching an an optimal set of input values when temperature is close to zero [32-34].

In the maximization problem, a change in the configuration of the system at temperature T is acceptable if the objective function is increased ($\Delta\tilde{C}_\gamma > 0$) or otherwise ($\Delta\tilde{C}_\gamma < 0$) may be accepted if the Boltzmann condition below is met [35].

$$\exp(\Delta\tilde{C}_\gamma/BT) > R \quad (20)$$

In the inequality above, R is a random number derived from the uniform distribution U [0, 1], T is the temperature, and B is the Boltzmann constant set to one. Additionally, the cooling factor follows a geometric distribution in which the new temperature is the product of the previous temperature and a number smaller than 1 [36, 37]. From (20), it is apparent that the probability of accepting non-improving changes depends on both the temperature which is the control parameter and the change in the objective function.

The traffic carried by the cluster is maximized without either exceeding the maximum traffic allowed by each cell $C_i$ or degrading the quality below the minimum quality threshold Q. The maximum traffic allowed $C_i$ is predicted by the learning algorithms described before, while the minimum quality Q allowed for individual cell is specified based on certain Radio Access Bearers (RABs) requirements.

The standard SA solution to the problem is illustrated in Algorithm 1. In the algorithm, $\tilde{C}_\gamma(\underline{x})$ is the total penalty-augmented carried traffic and $\underline{x} = (x_1, x_2, \ldots, x_N)$ is the set of parameter pairs of individual cells with $x_i = (\Delta\Omega_i, \Delta\Phi_i)$.

The worst case time complexity of the standard SA algorithm is in the order of $O(\sigma\rho N)$ considering its nested while loops. The number of iterations in the outer loop is set to $$\sigma = \frac{\log T_f - \log T_i}{\log a}$$

following the number of temperature points from geometric distribution and the number of iterations in the inner loop is set to $\rho N$ where $\rho$ is a fixed integer multiplier and N is the number of cellular towers.

SA with Hill Climbing

In an effort to get better results, a second algorithmic embodiment evaluates the performance of a revised alternative of the SA algorithm referred to as SA with hill climbing. This alternative attempts at evaluating m potential solutions at each step and choosing the best of those solutions before deciding to move to the next step. The additional attempts significantly increase the chances of improving the cost function compared to standard CSA algorithm at the cost of a much higher time complexity as discussed in [38]. The worst case time complexity of this algorithm is in the order of $O(m\sigma\rho N)$ where m is the number of search attempts at each step.

Block Coordinated Descent Simulated Annealing (BCDSA)

Inspired by the block coordinated descent optimization techniques [13, 14, 39], the third algorithmic embodiment modifies the SA algorithm in an attempt to address the tradeoff between accuracy and complexity. Referred to as BCDSA algorithm, this algorithmic variation applies the SA algorithm to a partitioned set of decision variables, i.e., optimizing one set while keeping the other set fixed, then optimizing the other set while keeping the first set fixed, and alternating between the two sets. Alternating between two sets of decision variables occurs if the cost function does not change after few iterations of one set measured by a freeze factor $\xi$. In the formulated optimization problem, there are two per cell decision variables, namely, $\Delta\Omega_i$ and $\Delta\Phi_i$. This means that the optimization alternates between a set of $\Delta\Omega_i$ values and a set of $\Delta\Omega_i$ values, i.e., the algorithm finds the optimal values of $\Delta\Omega_i$ with fixed values of $\Delta\Phi_i$ for all values of i∈I after selecting a random cell at a time. When the objective function is no longer changing, the algorithm switches between the two sets of decision variables and finds the optimal values of $\Delta\Phi_i$ with fixed values of $\Delta\Omega_i$ for all values of i∈I after selecting a random cell at a time. The algorithm then continues alternating between two sets of decision variables until reaching the optimal point or the maximum number of iterations. The BCDSA algorithm is explained in Algorithm 2.

With respect to convergence, BCDSA algorithm is conjectured to converge to a local optimal point in the vicinity of the global optimal solution of the formulated optimization problem. To support the claim, it is noted that [40] proves the convergence of SA algorithm to a local optimal point in the vicinity of the global optimal point for proper choices of parameters. Further, BCD algorithms are known to converge to stationary points if the Lagrangian function formed by the objective and the nonlinear constraint functions is convex and under milder conditions quasiconvex and hemivariate [41-43]. The BCDSA algorithm is primarily an SA algorithm augmented by BCD techniques and hence the choices of parameters warrant its convergence to a local optimal point. The effect of BCD augmentation is in essence improving its average speed and robustness of convergence. In the absence of a mathematical proof, BCDSA is consistently observed to robustly converge to a vicinity of the global optimal solution, identified by exhaustive search, in higher speeds and much better confidence intervals than standard SA and SA with hill climbing.

The worst case time complexity of the BCDSA algorithm is in the order of $O(\sigma\rho N)$ which is identical to that of standard SA. However, BCDSA has a better average time complexity compared to other SA alternatives. Further, it has much better success rates in converging to the vicinity of global optimal solutions than other SA alternatives.

Experimental Results

Simulation Assumptions and Parameter Values

Several assumptions are made as described below. First, it is assumed that only a number of but not all cells are congested and further congested cells have at least a neighbor that is not congested. Further, the 3G cellular network is operating in an urban environment with propagation loss coefficients $K_1=-35$ dB and $K_2=-40$ dB/decade. For simplicity, it is assumed 40% handover from a cell to its two facing neighbors and 10% to its co-site neighbors. Further, a reduction in $\Omega_i$ or increase in $\Phi_j$ results in 1.5 times reduction in $E_b/N_t$ for border users based on the selected urban environment and the typical inter site distance. Traffic is homogeneously distributed in the serving area and hence reduction in traffic served is at a rate similar to reduction in serving area. The range of variations of both $\Delta\Omega_i$ and $\Delta\Phi_i$ is [0, 6]dB with a granularity of 0.2 dB. Border users are assumed to be served with an $E_b/N_t$ value of approximately 10 dB and a minimum acceptable value no smaller than 7 dB [10]. The baseline for total traffic carried by all cells in the cluster in the scenario(s) of interest is measured to be 7937 Erlangs without parameter optimization.

It is critical to choose SA parameters to control the time complexity of the solution. In order to find the best values of the parameters, the performance of SA algorithm is first tested in a smaller network of 3 sites and 9 cells. It is observed that small values of the initial temperature $T_i$ of SA result in short runtimes but poor utility measured in terms of the maximum carried traffic. On the other hand, large values of $T_i$ result in longer runtimes but better utilities. The best value of $T_i$ is identified to be in the same order as the value of change in the utility function [35]. For example, if a utility function change in the range of 10 users is expected for the whole optimization, then $T_i$ has to be set to a value close to 10.

For the cooling factor a, choosing a value in the range of [0.5, 0.8] offers relatively quick convergence but poor final values of the utility function. To the contrary, using a higher value in the range of [0.95, 0.99] results in lower speeds of convergence but good values of utility function. It is experimentally observed that a value close to 0.9 is able to address the tradeoff between runtime and utility performance. This choice has an average runtime approximately half of the case of the cooling factor of 0.95 while 72% of the solutions introduced are within 1% of the best solution in this case. In comparison, the case of the cooling factor of 0.95 runs for double the time and introduces 85% of the solutions within 1% of the best solution. Test results are shown in FIG. 8.

Last but not least, measurements show prediction RMSE errors in the range of [2%, 3%] for the maximum available capacity $C_i$ of cell i using deep learning. In consideration of the error, a safety margin of 3% is applied to the predicted cell maximum available capacity $C_i$ when running optimizations. This ensures that non-congested cells accepting offloaded traffic do not exceed their maximum capacities and access failures associated with the prediction of breakpoints are eliminated.

Algorithmic Comparison Results

In conducting simulations, each scenario is run 20 times in order to measure best and average total traffic values and also to measure the consistency of algorithms in finding good solutions. A solution is considered good if the value of total carried traffic is within 1% of the best solution obtained using that solution. In comparing the results obtained from various algorithms, different aspects of performance are viewed in terms of a) cost measured as the algorithmic runtime, and b) quality measured as the best solution value, average solution value, and percentage of solutions that are within 1% of the best solution. This last parameter also measures the consistency of algorithm in finding good solutions, or what is referred to as success rate going forward. In the figures, the label SA Alternating represents a solution in which the optimization parameter is switched from CPiCH to CIO in every step of the algorithm regardless of the choice of the cell tower.

FIG. 9 provides a comparison of mean, maximum, and minimum values of the traffic carried by different algorithms within the cluster embodiment of FIG. 1 with an initial traffic capacity of 7937 Erlangs. The results of FIG. 9 reveal that the highest solution value at 8320 Erlangs is generated by SA hill climbing algorithm with m=8. However, the average solution value for this algorithm seems to be much lower at 8156 Erlang only. The best algorithm in terms of the average solutions value is BCDSA with a freeze parameter setting of $\xi=20$ at 8211 Erlangs. This algorithm is found to generate the second maximum carried traffic value at 8264 Erlangs, almost tied with SA hill climbing algorithm with a parameter setting of m=4. Comparing this last algorithm with standard SA algorithm at an average value of 8127 Erlangs and best value of 8224 Erlangs shows the improvement achieved by BCDSA algorithm.

FIG. 10 illustrates the convergence behavior captured by the average number of changes per temperature point and overall runtimes of various algorithms. The data in the figure shows that almost all algorithms are close in the average number of 1980 changes for each temperature points. These results also show that BCDSA algorithm with a parameter setting of $\xi=5$ has the lowest runtime at 4.76 seconds and in general BCDSA runtimes are shorter than 5.42 seconds needed by standard SA algorithm. Hence, BCDSA is up to 12% faster than the standard SA algorithm. The reason is mainly due to the fact that BCDSA escapes local minima faster than standard SA using its parameter switching mechanism. The results also show that using SA hill climbing with m=4 or 8 results in having runtimes of four to seven times higher than typical runtimes of the other two algorithms.

Finally, FIG. 11 offers a comparison of the highest number of users carried and success rate percentage for different algorithms within the cluster embodiment of FIG. 1. The results show that BCDSA with a parameter setting of $\xi=20$ has the highest percentage of success rate at 95%, i.e., 95% of the solutions generated by this algorithm are within 1% of the best solution value of 8224 Erlangs. Comparing this to standard SA algorithm at 45% success rate shows the dramatic improvement reached using BCDSA algorithm. In addition, BCDSA algorithm has the highest average traffic amongst all algorithms at 8211 Erlangs. The same success rate is seen for BCDSA with a parameter setting of $\xi=40$, however it has a lower average traffic at 8203 Erlangs. From the combined results above, it can be seen that BCDSA algorithm with a parameter setting of $\xi=20$ has the highest success rate at 95%, the second highest user traffic at 8263 Erlangs compared to the highest user traffic solution reached by SA hill climbing with m=8 at 8320 Erlangs, and the second lowest average runtime at 5 seconds compared to BCDSA with a parameter setting of $\xi=5$ at 4.75 seconds.

Discussion of Practicality of the Results

In practice, different embodiments of 3G cellular networks have typical update cycles of 15 minutes during which measurements are delivered and updates are made. Hence, network conditions are evaluated every 15 minutes and possible reconfiguration of traffic loading distribution can be applied based on optimizing control parameters. This means that optimization results of any algorithm are of practical value if the algorithm runs under 900 seconds allowing its results to be used in the next update cycle. Albeit the fact that the hardware and software platforms used in reported experiments comprise more limited computing resources compared to what may be used in a cellular Operation and Support System (OSS) to carry out optimizations, they still reflect the practicality of algorithmic embodiments and how their performances are compared.

Alterations, Modifications, and Clarifications

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

In some embodiments described herein using the phrase "comprising" includes embodiments that could be described as "consisting of", and as such the written description requirement for claiming one or more embodiments of the present invention using the phrase "consisting of" is met.

Reference numbers cited in the claims are exemplary, for ease of review by the patent office only, and are not limiting in any way.

Figures are representatives of concepts only and the claims are not limited by the figures in any ways.

PATENT CITATIONS

[1] U.S. Pat. No. 9,001,682, Content and RAN aware network selection in multiple wireless access and small-cell overlay wireless access networks.

[2] U.S. Pat. No. 8,755,405, Burst packet scheduler for improved ran efficiency in UMTS/HSPA networks.
[3] U.S. Pat. No. 8,488,507, Apparatus and methods for managing access and update requests in a wireless network.
[4] U.S. Pat. No. 8,259,659, Apparatus and methods for managing access and update requests in a wireless network.
[5] U.S. Pat. No. 8,085,709, Method and system for managing radio resources in mobile communication networks, related network and computer program product therefor.
[6] U.S. Pat. No. 7,197,311, Data routing in a universal mobile telecommunication system.
[7] U.S. Pat. No. 6,490,452, Group handover in a cellular communications network.

NON-PATENT CITATIONS

[8] A. H. A. Meciej, J Nawrocki, M. Dohler, *Understanding UMTS Radio Network Modeling, Planning and Automated Optimisation*. John Wiley & Sons, 2006.
[9] U. Turke and M. Koonert, "Advanced site configuration techniques for automatic umts radio network design," in *Vehicular Technology Conference, 2005. VTC 2005-Spring. 2005 IEEE 61st*, vol. 3, May 2005, pp. 1960-1964 Vol. 3.
[10] T. N. Jaana Laiho, Achim Wacker, *Radio Network Planning and Optimisation for UMTS*. John Wiley & Sons, 2006.
[11] I. Siomina, P. Varbrand, and D. Yuan, "Automated optimization of service coverage and base station antenna configuration in umts networks," *Wireless Communications, IEEE*, vol. 13, no. 6, pp. 16-25, December 2006.
[12] A. Chevallier, K. P. Christopher, M. Brunner and K. R. Baker, *WCDMA Deployment Handbook Planning and Optimization Aspects*. John Wiley & Sons, 2006.
[13] H. Yousefi'zadeh, A. Habibi, X. Li, H. Jafarkhani, and C. Bauer, "A statistical study of loss-delay tradeoff for red queues," *Communications, IEEE Transactions on*, vol. 60, no. 7, pp. 1966-1974, July 2012.
[14] Y. T. Lee and A. Sidford, "Efficient accelerated coordinate descent methods and faster algorithms for solving linear systems," in *Foundations of Computer Science (FOCS), 2013 IEEE 54th Annual Symposium on*, October 2013, pp. 147-156.
[15] M. Garcia-Lozano, S. Ruiz, and J. Olmos, "UMTS optimum cell load balancing for inhomogeneous traffic patterns," in *Vehicular Technology Conference, 2004. VTC2004-Fall. 2004 IEEE 60th*, vol. 2, September 2004, pp. 909-913 Vol. 2.
[16] I. Goodfellow, A. Courville, and Y. Bengio, "Deep learning," 2015, book in preparation for MIT Press. [Online]. Available: http://goodfeli.github.io/dlbook/
[17] S. McLoone, M. Brown, G. Irwin, and G. Lightbody, "A hybrid linear/nonlinear training algorithm for feedforward neural networks," *Neural Networks, IEEE Transactions on*, vol. 9, no. 4, pp. 669-684, July 1998.
[18] S. McLoone, V. Asirvadam, and G. Irwin, "A memory optimal bfgs neural network training algorithm," in *Neural Networks, 2002. IJCNN '02. Proceedings of the 2002 International Joint Conference on*, vol. 1, 2002, pp. 513-518.
[19] M. Wu and L. Chen, "Image recognition based on deep learning," in *Chinese Automation Congress (CAC), 2015*, November 2015, pp. 542-546.
[20] S. Haykin, *Neural Networks: A Comprehensive Foundation, 2/E*. Precntice Hall, 1988.
[21] P. Kuang, W.-N. Cao, and Q. Wu, "Preview on structures and algorithms of deep learning," in *Wavelet Active Media Technology and Information Processing (ICWAMTIP), 2014 11th International Computer Conference on*, December 2014, pp. 176-179.
[22] S. A. P. M. Minsky, *Perceptrons: An Introduction to Computational Geometry*. MIT Press, Cambridge, Mass., Expanded Edition, 1988.
[23] H. Yousefi'zadeh and E. Jonckheere, "Dynamic neural-based buffer management for queuing systems with self-similar characteristics," *Neural Networks, IEEE Transactions on*, vol. 16, no. 5, pp. 1163-1173, September 2005.
[24] X. bin Li and X.-L. Yu, "Influence of sample size on prediction of animal phenotype value using back-propagation artificial neural network with variable hidden neurons," in *Computational Intelligence and Software Engineering, 2009. CiSE 2009. International Conference on*, December 2009, pp. 1-4.
[25] V. Garg and R. Bansal, "Comparison of neural network back propagation algorithms for early detection of sleep disorders," in *Computer Engineering and Applications (ICACEA), 2015 International Conference on Advances in*, March 2015, pp. 71-75.
[26] M. Apostolopoulou, D. Sotiropoulos, I. Livieris, and P. Pintelas, "A memoryless bfgs neural network training algorithm," in *Industrial Informatics, 2009. INDIN 2009. 7th IEEE International Conference on*, June 2009, pp. 216-221.
[27] S. Fahlman, *An Empirical Study of Learning Speed in Back-Propagation Networks*. Technical Report CMU-CS-88-162, Carnegie Mellon University, 1988.
[28] A. F. C. Hurtado. (2005, October) Umts capacity simulation study, master of science in telematics thesis.
[29] I. Necoara, "A random coordinate descent method for large-scale resource allocation problems," in *Decision and Control (CDC), 2012 IEEE 51st Annual Conference on*, December 2012, pp. 4474-4479.
[30] B. Wah, Y. Chen, and A. Wan, "Constrained global optimization by constraint partitioning and simulated annealing," in *Tools with Artificial Intelligence, 2006. ICTAI '06. 18th IEEE International Conference on*, November 2006, pp. 265-274.
[31] Y. Cui, K. Xu, J. Wu, Z. Yu, and Y. Zhao, "Multi-constrained routing based on simulated annealing," in *Communications, 2003. ICC '03. IEEE International Conference on*, vol. 3, May 2003, pp. 1718-1722 vol. 3.
[32] R. ZeinEldin, "An improved simulated annealing approach for solving the constrained optimization problems," in *Informatics and Systems (INFOS), 2012 8th International Conference on*, May 2012, pp. BIO-27-BIO-31.
[33] B. Wah and T. Wang, "Constrained simulated annealing with applications in nonlinear continuous constrained global optimization," in *Tools with Artificial Intelligence, 1999. Proceedings. 11th IEEE International Conference on*, 1999, pp. 381-388.
[34] H. Singh, A. Isaacs, T. Ray, and W. Smith, "A simulated annealing algorithm for constrained multi-objective optimization," in *Evolutionary Computation, 2008. CEC 2008. (IEEE World Congress on Computational Intelligence). IEEE Congress on*, June 2008, pp. 1655-1662.
[35] S. Mohammadi, C. Shang, Z. Ouhib, T. Leventouri, and G. Kalantzis, "A computational study on different penalty approaches for constrained optimization in radiation therapy treatment planning with a simulated annealing algorithm," in *Software Engineering, Artificial Intelli-* gence, *Networking and Parallel/Distributed Computing (SNPD), 2015 16th IEEE/ACIS International Conference on*, June 2015, pp. 1-6.

[36] X. Yao, X. Liu, G. Hu, and F. Qian, "Link delay inference based on simulated annealing constrained optimization method," in *Wireless, Mobile and Multimedia Networks, 2006 IET International Conference on*, November 2006, pp. 1-4.

[37] Y. Kim and M. Lee, "Scheduling multi-channel and multi-timeslot in time constrained wireless sensor networks via simulated annealing and particle swarm optimization," *Communications Magazine, IEEE*, vol. 52, no. 1, pp. 122-129, January 2014.

[38] E.-G. Talbi and T. Muntean, "Hill-climbing, simulated annealing and genetic algorithms: a comparative study and application to the mapping problem," in *System Sciences, 1993, Proceeding of the Twenty-Sixth Hawaii International Conference on*, vol. ii, January 1993, pp. 565-573 vol. 2.

[39] R. Qi and S. Zhou, "Simulated annealing partitioning: An algorithm for optimizing grouping in cancer data," in *Data Mining Workshops (ICDMW), 2013 IEEE 13th International Conference on*, December 2013, pp. 281-286.

[40] B. Hajek, "Cooling shcedules for optimal annealing," *Operations Research*, May 1988.

[41] J. Ortega and W. Rheinboldt, *Iterative Solutions of Nonlinear Equations in Several Variables*. Academic Press, New York, N.Y., 1970.

[42] P. Tseng, "Convergence of a block coordinate descent method for nondifferentiable minimization," *Journal of Optimization Theory and Applications*, June 2001. [43] A. Beck and L. Tetruashvili, "On the convergence of block coordinate descent type methods," *SIAM Journal on Optimization*, January 2013.

---

Algorithm 1: CSA(Topology, Breakpoints)

---

Form penalty-augmented objective function $\tilde{C}_\gamma(\underline{x})$
  where $\underline{x} = (x_1, x_2, \ldots, x_N), x_i = (\Delta\Omega_i, \Delta\Phi_i)$
Set initial values $\underline{x}[0]$ and $T = T_i$
Set $K = \rho N$ and final value $T_f$
Set cooling factor a in interval [0, 1]
While ($T > T_f$) /* Temperature Bound */
  Set $k = 0$
  While ($k \leq K$) /* Iteration Bound */
    Choose a random cell i, random $\Delta\Omega_i$, and $\Delta\Phi_i$
    $x_i = (\Omega_i - \Delta\Omega_i, \Phi_i + \Delta\Phi_i)$
    $\Delta\tilde{C}_\gamma = \tilde{C}_\gamma(\underline{x}[k]) - \tilde{C}_\gamma(\underline{x}[k-1])$
    if $\Delta\tilde{C}_\gamma > 0$
      Accept new solution: $\tilde{C}_\gamma^* = \tilde{C}_\gamma, \underline{x}^* = \underline{x}$
    elseif $\Delta\tilde{C}_\gamma < 0$
      Generate a random number R in interval [0, 1]
      if $\exp[\Delta\tilde{C}_\gamma/T] > R$
        Accept new solution: $\tilde{C}_\gamma^* = \tilde{C}_\gamma, \underline{x}^* = \underline{x}$
      end if / else
    $k = k + 1$
  End /* {While($k < K$)} */
  $T = a * T$
End /* {While($T > T_f$)} */

Algorithm 1: A description of constrained simulated annealing algorithm.

---

Algorithm 2: BCDSA(Topology, Breakpoints)

---

Form penalty-augmented objective function $\tilde{C}_\gamma(\underline{x})$ where $\underline{x} = (x_1, x_2, \ldots, x_N), x_i = (\Delta\Omega_i, \Delta\Phi_i)$
Set initial values $\underline{x}[0]$ and $T = T_i$
Set $K = \rho N$ and final value $T_f$
Set cooling factor a in interval [0, 1]

---

Algorithm 2: BCDSA(Topology, Breakpoints)

---

Define max freeze factor $\xi_{max}$
$\forall_i$, Optimize $\Delta\Omega_i$ but freeze $\Delta\Phi_i$
While ($T > T_f$) /* Temperature Bound */
  Set $k = 0, \xi = 0$
  While ($k \leq K$) /* Iteration Bound */
    Choose a random cell i
    if Optimizing $\Delta\Omega_i$, then $x_i = (\Omega_i - \Delta\Omega_i, \Phi_i)$
    elseif Optimizing $\Delta\Phi_i$, then $x_i = (\Omega_i, \Phi_i + \Delta\Phi_i)$
    end if / else
    $\Delta\tilde{C}_\gamma = \tilde{C}_\gamma(\underline{x}[k]) - \tilde{C}_\gamma(\underline{x}[k-1])$
    if $\Delta\tilde{C}_\gamma > 0$, then accept the new solution: $\tilde{C}_\gamma^* = \tilde{C}_\gamma, \underline{x}^* = \underline{x}$
    elseif $\Delta\tilde{C}_\gamma < 0$
      Generate a random number R in interval [0, 1]
      if $\exp[\Delta\tilde{C}_\gamma/T] > R$, then accept the new solution:
        $\tilde{C}_\gamma^* = \tilde{C}_\gamma, \underline{x}^* = \underline{x}$
    end if / else
    if $\tilde{C}_\gamma[k] = \tilde{C}_\gamma[k-1]$ /* $\tilde{C}_\gamma$ is not changing! */
      $\xi = \xi + 1$
    else
      $\xi = 0$
    end if / else
    $k = k + 1$
    if ($\xi > \xi_{max}$) /* Switch decision variables */
      if Optimizing $\Delta\Omega_i$
        $\forall i$, Optimize $\Delta\Phi_i$ but freeze $\Delta\Omega_i$
      elseif Optimizing $\Delta\Phi_i$
        $\forall i$, Optimize $\Delta\Omega_i$ but freeze $\Delta\Phi_i$
      end if / else
      $\xi = 0$
    end
  End /* {While ($k < K$)} */
  $T = a * T$
End /* {While ($T > T_f$)} */

Algorithm 2: A description of block coordinated descent simulated annealing algorithm.

The invention claimed is:

1. A method of redistributing traffic from congested cellular towers to non-congested cellular towers in a 3G cellular network for the purpose of increasing the capacity of said cellular network wherein said cellular network comprises clusters, clusters comprise sites, and sites comprise cellular towers, and wherein the method comprises:
   a. importing per cellular tower information including neighbor handover, traffic demand, traffic carried, average transmit power, and minimum acceptable quality;
   b. waiting for the expiration of a refresh timer;
   c. importing additionally collected learning measurements since the previous expiration of said refresh timer;
   d. applying an MLPDL technique to predict breakpoints of the plurality of both congested and non-congested cellular towers one cellular tower at a time, wherein a breakpoint reflects the maximum load limit of associated cellular tower;
   e. applying inputs to the BCDSA algorithm including imported topology information and predicted breakpoints;
   f. performing the BCDSA algorithm to generate CPiCH and CIO values of the plurality of both congested and non-congested cellular towers; and
   g. going back to step b to wait again for the expiration of said refresh timer.

2. The method of claim 1, wherein the MLPDL technique utilizes a fixed structure fully connected perceptron network for predicting the plurality of the breakage points of each cellular tower one cellular tower at a time.

3. The method of claim 2, wherein the fixed structure comprises an input layer, one or more hidden layers, and an output layer, and wherein each layer comprises a number of processing elements.

4. The method of claim 3, wherein data flow through each processing element comprises generating the output of processing element after applying a nonlinear function to individually weighted inputs of said processing element.

5. The method of claim 3, wherein inputs of a processing element comprise the outputs of all processing elements in the adjacent layer below the layer in which the processing element is located.

6. The method of claim 3, wherein the set of inputs to the processing elements of the input layer comprise collected historical data of the plurality of cellular towers within the cellular network.

7. The method of claim 2, wherein the MLPDL technique provides an iterative learning process to improve the accuracy of the predicted breakpoint of each cellular tower individually calculated as the error between the actual value of the breakpoint and the output of MLPDL.

8. The method of claim 7, wherein the stoppage criterion of iterative learning process comprises reaching a maximum number of iterations or an error below a small threshold of accuracy.

9. The method of claim 7, wherein each learning iteration is comprised of a forward propagation of the input followed by a backward propagation of the output error.

10. The method of claim 9, wherein during forward propagation of each iteration inputs are propagated from the input layer toward the output layer through hidden layers one layer at a time to set all input and output states of all processing elements.

11. The method of claim 9, wherein during back propagation of each iteration the output error is propagated back toward the input layer through hidden layers one layer at a time to adjust the weighting function between each processing element and individual processing elements in the layer below.

12. The method of claim 1, wherein the BCDSA algorithm applies changes to power CPiCH and handover threshold CIO of individual cellular towers as decision variables to reduce congestion.

13. The method of claim 12, wherein reducing the control power CPiCH of a cellular tower results in reducing the coverage boundary of said cellular tower hence shifting users connected to said cellular tower far from its center to neighboring cellular towers, and allocating said reduced power from control channel to traffic channel results in serving more users closer to the center of said cellular tower thereby reducing the overall congestion of said cellular tower.

14. The method of claim 12, wherein increasing the CIO of a cellular tower results in increasing the handover boundary of said cellular tower and shifting users from congested neighboring cellular towers to said cellular tower thereby reducing the congestion of congested neighboring cellular towers.

15. The method of claim 12, wherein the BCDSA algorithm provides a nested iterative process, in which the inner iterative process stops after reaching a maximum number of iterations and the outer iterative process stops after an initial temperature reaches a final temperature as the result of getting sequentially multiplied by a cooling factor with a value smaller than one.

16. The method of claim 15, wherein the BCDSA algorithm partitions the decision variables to two sets comprising a set of CPiCH variables and a set of CIO variables and optimizes one set of decision variables in each iteration of the inner iterative process while keeping the other set fixed at that iteration.

17. The method of claim 16, wherein the BCDSA algorithm changes the capacity of a cellular network in each iteration of the inner iterative process, comprising the steps of:
  a. choosing a random cell i;
  b. if optimizing CPiCH, subtracting a random value selected from within a range of predefined values from the current CPiCH value of cell i;
  c. else if optimizing CIO, adding a random value selected from within a range of predefined values to the current CIO value of cell i;
  d. calculating the change in the total capacity of said cellular network as the result of applying CPiCH or CIO change;
  e. accepting the new solution, if the change is positive;
  f. performing the following test, if the change is negative;
    i. generating a random number R in the range [0,1];
    ii. accepting the new solution, if the exponential value of the ratio of the change and the current temperature is more than R; or
    iii. rejecting the new solution, otherwise.

18. The method of claim 17, wherein the BCDSA algorithm alternates between the set of CPiCH and the set of CIO decision variables within the inner iterative process based on comparing the previous and current values of the total capacity of the cellular network against freezing thresholds thereby reflecting minor improvements.

19. The method of claim 18, wherein freezing thresholds are set dynamically aiming at maximizing step improvement and minimizing run time.

20. A computer program product stored in a non-transitory computer readable storage medium to redistribute traffic from congested cellular towers to non-congested cellular towers in a 3G cellular network for the purpose of increasing the capacity of said cellular network wherein said cellular network comprises clusters, clusters comprise sites, and sites comprise cellular towers, and wherein the computer program comprises:
  a. code for importing per cellular tower information including neighbor handover, traffic demand, traffic carried, average transmit power, and minimum acceptable quality;
  b. code waiting for the expiration of a refresh timer;
  c. code for importing additionally collected learning measurements since the previous expiration of said refresh timer;
  d. code for applying a Machine Learning Regression and an MLPDL technique to predict breakpoints of the plurality of both congested and non-congested cellular towers one cellular tower at a time, wherein a breakpoint reflects the maximum load limit of associated cellular tower;
  e. code for applying inputs to the BCDSA algorithm including imported topology information and predicted breakpoints;
  f. code for performing the BCDSA algorithm to generate CPiCH and CIO values of the plurality of both congested and non-congested cellular towers; and
  g. code for going back to step b to wait again for the expiration of said refresh timer.

21. The computer program of claim 20, wherein the MLPDL technique utilizes a fixed structure fully connected perceptron network for predicting the plurality of the breakage points of each cellular tower one cellular tower at a time.

22. The computer program of claim 21, wherein the fixed structure comprises an input layer, one or more hidden layers, and an output layer, and wherein each layer comprises a number of processing elements.

23. The computer program of claim 22, wherein data flow through each processing element comprises generating the output of processing element after applying a nonlinear function to individually weighted inputs of said processing element.

24. The computer program of claim 22, wherein inputs of a processing element comprise the outputs of all processing elements in the adjacent layer below the layer in which the processing element is located.

25. The computer program of claim 22, wherein the set of inputs to the processing elements of the input layer comprise collected historical data of the plurality of cellular towers within the cellular network.

26. The computer program of claim 21, wherein the MLPDL technique provides an iterative learning process to improve the accuracy of the predicted breakpoint of each cellular tower individually calculated as the error between the actual value of the breakpoint and the output of MLPDL.

27. The computer program of claim 26, wherein the stoppage criterion of iterative learning process comprises reaching a maximum number of iterations or an error below a small threshold of accuracy.

28. The computer program of claim 26, wherein each learning iteration is comprised of a forward propagation of the input followed by a backward propagation of the output error.

29. The computer program of claim 28, wherein during forward propagation of each iteration inputs are propagated from the input layer toward the output layer through hidden layers one layer at a time to set all input and output states of all processing elements.

30. The computer program of claim 28, wherein during back propagation of each iteration the output error is propagated back toward the input layer through hidden layers one layer at a time to adjust the weighting function between each processing element and individual processing elements in the layer below.

31. The computer program of claim 20, wherein the BCDSA algorithm applies changes to power CPiCH and handover threshold CIO of individual cellular towers as decision variables to reduce congestion.

32. The computer program of claim 31, wherein reducing the control power CPiCH of a cellular tower results in reducing the coverage boundary of said cellular tower hence shifting users connected to said cellular tower far from its center to neighboring cellular towers, and allocating said reduced power from control channel to traffic channel results in serving more users closer to the center of said cellular tower thereby reducing the overall congestion of said cellular tower.

33. The computer program of claim 31, wherein increasing the CIO of a cellular tower results in increasing the handover boundary of said cellular tower and shifting users from congested neighboring cellular towers to said cellular tower thereby reducing the congestion of congested neighboring cellular towers.

34. The computer program of claim 31, wherein the BCDSA algorithm provides a nested iterative process, in which the inner iterative process stops after reaching a maximum number of iterations and the outer iterative process stops after an initial temperature reaches a final temperature as the result of getting sequentially multiplied by a cooling factor with a value smaller than one.

35. The computer program of claim 34, wherein the BCDSA algorithm partitions the decision variables to two sets comprising a set of CPiCH variables and a set of CIO variables and optimizes one set of decision variables in each iteration of the inner iterative process while keeping the other set fixed at that iteration.

36. The computer program of claim 35, wherein the BCDSA algorithm changes the capacity of a cellular network in each iteration of the inner iterative process, comprising the steps of:
   a. choosing a random cell i;
   b. if optimizing CPiCH, subtracting a random value selected from within a range of predefined values from the current CPiCH value of cell i;
   c. else if optimizing CIO, adding a random value selected from within a range of predefined values to the current CIO value of cell i;
   d. calculating the change in the total capacity of said cellular network as the result of applying CPiCH or CIO change;
   e. accepting the new solution, if the change is positive;
   f. performing the following test, if the change is negative;
      i. generating a random number R in the range [0,1];
      ii. accepting the new solution, if the exponential value of the ratio of the change and the current temperature is more than R; or
      iii. rejecting the new solution, otherwise.

37. The computer program of claim 36, wherein the BCDSA algorithm alternates between the set of CPiCH and the set of CIO decision variables within the inner iterative process based on comparing the previous and current values of the total capacity of the cellular network against freezing thresholds thereby reflecting minor improvements.

38. The computer program of claim 37, wherein freezing thresholds are set dynamically aiming at maximizing step improvement and minimizing run time.

39. A system comprising processors and memory coupled to processors, the memory storing instructions readable by a computing device that, when executed by processors, cause processors to perform operations to redistribute traffic from congested cellular towers to non-congested cellular towers in a 3G cellular network for the purpose of increasing the capacity of said cellular network wherein said cellular network comprises clusters, clusters comprise sites, and sites comprise cellular towers, and wherein said operations comprise:
   a. importing per cellular tower information including neighbor handover, traffic demand, traffic carried, average transmit power, and minimum acceptable quality;
   b. waiting for the expiration of a refresh timer;
   c. importing additionally collected learning measurements since the previous expiration of said refresh timer;
   d. applying a Machine Learning Regression and an MLPDL technique to predict breakpoints of the plurality of both congested and non-congested cellular towers one cellular tower at a time, wherein a breakpoint reflects the maximum load limit of associated cellular tower;
   e. applying inputs to the BCDSA algorithm including imported topology information and predicted breakpoints;
   f. performing the BCDSA algorithm to generate CPiCH and CIO values of the plurality of both congested and non-congested cellular towers; and
   g. going back to step b to wait again for the expiration of said refresh timer.

40. The system of claim 39, wherein the MLPDL technique utilizes a fixed structure fully connected perceptron network for predicting the plurality of the breakage points of each cellular tower one cellular tower at a time.

41. The system of claim 40, wherein the fixed structure comprises an input layer, one or more hidden layers, and an output layer, and wherein each layer comprises a number of processing elements.

42. The system of claim 41, wherein data flow through each processing element comprises generating the output of processing element after applying a nonlinear function to individually weighted inputs of said processing element.

43. The system of claim 41, wherein inputs of a processing element comprise the outputs of all processing elements in the adjacent layer below the layer in which the processing element is located.

44. The system of claim 41, wherein the set of inputs to the processing elements of the input layer comprise collected historical data of the plurality of cellular towers within the cellular network.

45. The system of claim 40, wherein the MLPDL technique provides an iterative learning process to improve the accuracy of the predicted breakpoint of each cellular tower individually calculated as the error between the actual value of the breakpoint and the output of MLPDL.

46. The system of claim 45, wherein the stoppage criterion of iterative learning process comprises reaching a maximum number of iterations or an error below a small threshold of accuracy.

47. The system of claim 45, wherein each learning iteration is comprised of a forward propagation of the input followed by a backward propagation of the output error.

48. The system of claim 47, wherein during forward propagation of each iteration inputs are propagated from the input layer toward the output layer through hidden layers one layer at a time to set all input and output states of all processing elements.

49. The system of claim 47, wherein during back propagation of each iteration the output error is propagated back toward the input layer through hidden layers one layer at a time to adjust the weighting function between each processing element and individual processing elements in the layer below.

50. The system of claim 39, wherein the BCDSA algorithm applies changes to power CPiCH and handover threshold CIO of individual cellular towers as decision variables to reduce congestion.

51. The system of claim 50, wherein reducing the control power CPiCH of a cellular tower results in reducing the coverage boundary of said cellular tower hence shifting users connected to said cellular tower far from its center to neighboring cellular towers, and allocating said reduced power from control channel to traffic channel results in serving more users closer to the center of said cellular tower thereby reducing the overall congestion of said cellular tower.

52. The system of claim 50, wherein increasing the CIO of a cellular tower results in increasing the handover boundary of said cellular tower and shifting users from congested neighboring cellular towers to said cellular tower thereby reducing the congestion of congested neighboring cellular towers.

53. The system of claim 50, wherein the BCDSA algorithm provides a nested iterative process, in which the inner iterative process stops after reaching a maximum number of iterations and the outer iterative process stops after an initial temperature reaches a final temperature as the result of getting sequentially multiplied by a cooling factor with a value smaller than one.

54. The system of claim 53, wherein the BCDSA algorithm partitions the decision variables to two sets comprising a set of CPiCH variables and a set of CIO variables and optimizes one set of decision variables in each iteration of the inner iterative process while keeping the other set fixed at that iteration.

55. The system of claim 54, wherein the BCDSA algorithm changes the capacity of a cellular network in each iteration of the inner iterative process, comprising the steps of:
   a. choosing a random cell i;
   b. if optimizing CPiCH, subtracting a random value selected from within a range of predefined values from the current CPiCH value of cell i;
   c. else if optimizing CIO, adding a random value selected from within a range of predefined values to the current CIO value of cell i;
   d. calculating the change in the total capacity of said cellular network as the result of applying CPiCH or CIO change;
   e. accepting the new solution, if the change is positive;
   f. performing the following test, if the change is negative;
      i. generating a random number R in the range [0,1];
      ii. accepting the new solution, if the exponential value of the ratio of the change and the current temperature is more than R; or
      iii. rejecting the new solution, otherwise.

56. The system of claim 55, wherein the BCDSA algorithm alternates between the set of CPiCH and the set of CIO decision variables within the inner iterative process based on comparing the previous and current values of the total capacity of the cellular network against freezing thresholds thereby reflecting minor improvements.

57. The system of claim 56, wherein freezing thresholds are set dynamically aiming at maximizing step improvement and minimizing run time.

* * * * *